United States Patent
Tsujimoto

(10) Patent No.: US 12,473,194 B2
(45) Date of Patent: Nov. 18, 2025

(54) MELTING DEVICE, MELTING METHOD, AND DOUBLE PIPE

(71) Applicant: FUJI OIL CO., LTD., Izumisano (JP)

(72) Inventor: Akira Tsujimoto, Izumisano (JP)

(73) Assignee: FUJI OIL CO., LTD., Izumisano (JP)

( * ) Notice: Subject to any disclaimer, the term of this patent is extended or adjusted under 35 U.S.C. 154(b) by 964 days.

(21) Appl. No.: 17/603,777

(22) PCT Filed: May 1, 2020

(86) PCT No.: PCT/JP2020/018403
§ 371 (c)(1),
(2) Date: Oct. 14, 2021

(87) PCT Pub. No.: WO2020/230670
PCT Pub. Date: Nov. 19, 2020

(65) Prior Publication Data
US 2022/0194778 A1 Jun. 23, 2022

(30) Foreign Application Priority Data

May 10, 2019 (JP) ................................. 2019-089987
Aug. 26, 2019 (JP) ................................. 2019-153495

(51) Int. Cl.
*B67D 7/82* (2010.01)
*B01J 4/00* (2006.01)
*B01J 6/00* (2006.01)

(52) U.S. Cl.
CPC ................ *B67D 7/82* (2013.01); *B01J 4/001* (2013.01); *B01J 6/00* (2013.01)

(58) Field of Classification Search
CPC ..................................... B67D 7/80; B67D 7/82
See application file for complete search history.

(56) References Cited

U.S. PATENT DOCUMENTS 2,965,362 A * 12/1960 Flottmann ........... B01F 25/3121
366/279
3,673,147 A * 6/1972 Bor .......................... D01F 6/62
523/319

(Continued)

FOREIGN PATENT DOCUMENTS

CN 104903995 A 9/2015
EP 1035912 B1 8/2004

(Continued)

OTHER PUBLICATIONS

English translation of JP H11256541A, Matsumoto H., Sep. 21, 1999, obtained Sep. 20, 2024 from < https://worldwide.espacenet.com/> (Year: 2024).*

(Continued)

*Primary Examiner* — Claire X Wang
*Assistant Examiner* — Patrick M McCarty
(74) *Attorney, Agent, or Firm* — MH2 Technology Law Group, LLP

(57) ABSTRACT

Provided is a melting device for discharging a melt of a substance to the inside of a tank to melt the substance stored in the tank, the melting device being capable of discharging a desired amount of the melt into the tank, while reducing the diameter of a discharge pipe that discharges the melt of the substance. The melting device 1 of the present invention comprises a suction pipe 2 and a discharge pipe 3 that are attached to the wall T of a tank; and a circulation flow path 4 that is disposed outside the tank T. The inside of the tank T and the inside of one end 4a of the circulation flow path 4 communicate with each other through the inside of the suction pipe 2. The inside of the tank T and the inside of the other end 4b of the circulation flow path 4 communicate with each other through the inside of the discharge pipe 3. A pump 5 is provided at a midway position of the circulation flow path 4. By driving the pump 5, a melt Ma of substance (Continued)

M that is present inside the tank T can be suctioned into the suction pipe 2, circulated through the circulation flow path 4, and discharged from the inside of the discharge pipe 3 to the inside of the tank T; and the entirety of the inside of the discharge pipe 3 is used as a flow path for the melt Ma.

20 Claims, 16 Drawing Sheets

(56) References Cited

U.S. PATENT DOCUMENTS

| | | | | |
|---|---|---|---|---|
| 3,714,978 | A | * | 2/1973 | Pirk ............... C01G 43/063 165/70 |
| 3,874,399 | A | * | 4/1975 | Ishihara ............ B63B 27/24 137/15.16 |
| RE28,524 | E | * | 8/1975 | Brebant ............. C11B 3/14 202/205 |
| 4,067,663 | A | * | 1/1978 | Brooks ............. F04D 9/045 417/199.2 |
| 4,323,174 | A | * | 4/1982 | Wood ............... B05C 17/002 222/413 |
| 4,361,462 | A | * | 11/1982 | Fujii ................ B01D 1/226 159/49 |
| 4,622,135 | A | * | 11/1986 | Williams .......... A47J 37/1223 210/167.28 |
| 4,958,934 | A | * | 9/1990 | Saito ............... B01J 6/005 366/144 |
| 5,152,212 | A | * | 10/1992 | Chauveau .......... A23G 1/105 366/144 |
| 5,468,117 | A | * | 11/1995 | Lobko .............. B65D 88/54 222/394 |
| 6,002,838 | A | | 12/1999 | Nir |
| 9,852,888 | B2 | | 12/2017 | Goto |
| 2004/0124387 | A1 | * | 7/2004 | Schutz ............. F16K 27/067 428/36.9 |
| 2006/0060607 | A1 | * | 3/2006 | Chang .............. F25D 31/006 222/146.6 |
| 2007/0006874 | A1 | * | 1/2007 | Potter .............. E01H 5/102 126/343.5 R |
| 2008/0073058 | A1 | | 3/2008 | Ueyama |
| 2010/0080077 | A1 | * | 4/2010 | Coy ................ B01F 25/21 366/137 |
| 2010/0122981 | A1 | * | 5/2010 | Sims ............... B65D 90/046 251/366 |
| 2012/0186672 | A1 | * | 7/2012 | Fisenko ........... B01F 25/31233 137/565.01 |
| 2013/0105039 | A1 | | 5/2013 | Tix |
| 2013/0105526 | A1 | * | 5/2013 | Ross ............... B29B 13/022 222/630 |
| 2013/0112312 | A1 | | 5/2013 | Ross |
| 2016/0196954 | A1 | | 7/2016 | Goto |
| 2016/0234886 | A1 | * | 8/2016 | Laghi .............. H01R 11/32 |
| 2016/0281029 | A1 | * | 9/2016 | Rautiainen ........ C10L 1/026 |
| 2017/0130884 | A1 | * | 5/2017 | Hartman .......... F16L 35/00 |
| 2017/0174502 | A1 | | 6/2017 | White |
| 2018/0037450 | A1 | * | 2/2018 | Applegate ........ B67D 7/145 |
| 2018/0063896 | A1 | * | 3/2018 | Deussen ........... F01N 3/2066 |
| 2019/0125499 | A1 | * | 5/2019 | Uchitel ............ A61C 1/0092 |
| 2021/0138410 | A1 | * | 5/2021 | Tachibana ........ B01F 23/2373 |

FOREIGN PATENT DOCUMENTS

| | | | | |
|---|---|---|---|---|
| JP | S57-122283 | U | | 7/1982 |
| JP | S5939902 | Y2 | | 11/1984 |
| JP | H03110333 | A | * | 5/1991 |
| JP | H11-256541 | A | | 9/1999 |
| JP | 3927593 | B1 | | 6/2007 |
| JP | 2007-533948 | A | | 11/2007 |
| JP | 2008184890 | A | | 8/2008 |
| JP | 2009281664 | A | * | 12/2009 ......... B29C 63/0013 |
| JP | 4639228 | B2 | | 12/2010 |
| SU | 1549859 | A1 | * | 3/1990 |
| TW | 201341296 | A | | 10/2012 |
| WO | 2005/103594 | A1 | | 11/2005 |

OTHER PUBLICATIONS

International Search Report (with English translation) mailed Jun. 9, 2020 for International Application No. PCT/JP2020/018403, 4 pages.

Japanese Office Action dated Jul. 16, 2019 for corresponding Japanese Patent Application No. 2019-089987, 7 pages with machine translation.

Japanese Office Action dated Nov. 26, 2019 for corresponding Japanese Patent Application No. 2019-153495, 5 pages with machine translation.

European Office Action dated Aug. 1, 2024 for corresponding European Application No. 20805178.9, 15 pages.

Partial Supplementary European Search Report dated Dec. 12, 2022 for corresponding European Patent Application No. 20805178.9, 23 pages.

Chinese Office Action with English language translation mailed in CN 202080033957.X on Mar. 23, 2024. (17 Pages).

F. Yang et al., "Experimental study on a new self-priming equipment of centrifugal pumps," Drainage and Irrigation Machinery, vol. 25, No. 4, pp. 14-17, Jul. 2017 (English translation of Abstract).

Vivek, Vaibhav (Controller), Office Action dated Aug. 17, 2023 for corresponding Indian Application No. 2021-47055847, 6 pages (with English translation).

De Souza (Division Boss), Office Action dated Dec. 26, 2023 for corresponding Brazilian Application No. 112021020416-4, with English language translation, 7 pages.

* cited by examiner

MELTING DEVICE, MELTING METHOD, AND DOUBLE PIPE

CROSS-REFERENCE TO RELATED APPLICATIONS

This application is a U.S. National Stage application of PCT/JP2020/018403 filed 1 May 2020, which claims priority to Japanese Application No. 2019-089987 filed 10 May 2019, and Japanese Application No. 2019-153495 filed 26 Aug. 2019, the entire disclosures of which are incorporated herein by reference in their entireties.

TECHNICAL FIELD

The present invention relates to a melting device and a double pipe for discharging a melt of a substance into a tank to melt the substance stored in the tank; and a method for melting a substance using the melting device.

BACKGROUND ART

Conventionally, in international trade, fats and oils that are solid at ordinary temperature are transported by ship. During this transportation, a fat or oil in a liquid state is placed into a tank at the point of departure (the country of origin of the fat or oil), and the tank is loaded onto a ship. At the destination (the country of import of the fat or oil), the fat or oil that has solidified into a solid state in the tank during transportation is melted.

Flexible tanks made of vinyl are used to transport such oils and fats. Patent Literature (PTL) 1 discloses a technique that uses a heat exchanger to melt a substance solidified in a flexible tank during transportation. (The heat exchanger 200 shown in FIGS. 14 to 16 is a schematic representation of the heat exchanger disclosed in PTL 1.)

The heat exchanger of PTL 1 (heat exchanger 200 shown in FIGS. 14 to 16) is configured such that a second pipe 203 is disposed inside the first pipe 202; a third pipe 206 is disposed inside the second pipe 203; a fourth pipe 207 is disposed inside the third pipe 206; and a suction port 201 for suctioning a substance M in tank T (FIGS. 15 and 16) is formed by a gap between the first pipe 202 and the second pipe 203. A plurality of discharge ports 205 for discharging heated substance Ma into tank T are formed on the peripheral wall of the second pipe 203. Hot water P is allowed to flow inside the third pipe 206 and the fourth pipe 207 (specifically, hot water P is allowed to flow from the space outside the fourth pipe 207 in the third pipe 206 to the inside of the fourth pipe 207).

When a fat or oil is transported, the heat exchanger 200 is disposed in the flexible tank T at the point of departure. After this, the flexible tank T is filled with a liquid substance M. When the tank T arrives at its destination, a centrifugal force pump is driven to suction the substance M in the tank T into the heat exchanger 200 from the suction port 201; heat-exchange the substance M with hot water P in the heat exchanger 200; and also discharge the substance Ma heated by the heat exchange into the tank T from the discharge port 205 in order to melt the substance M in the tank T, which has solidified during transportation (FIG. 15). As a result, the heated substance Ma circulates in the tank T and is heat-exchanged with an unmelted substance M, thereby causing the substance M in the tank T to melt.

CITATION LIST

Patent Literature

PTL 1: Japanese Patent No. 4639228

SUMMARY OF INVENTION

Technical Problem

A general flexible tank T comprises a valve whose dimensions are specified by a standard (FIGS. 10 and 11 described below show a valve 50 attached to a general flexible tank T). Any pipe that can be inserted into the hole of this valve can be easily attached to the flexible tank (i.e., the pipe can be attached to the tank by easy operation of inserting the pipe into the hole of the valve to fix the pipe to the valve etc.).

In this regard, in the heat exchanger of Patent Literature (PTL) 1 (heat exchanger 200 shown in FIGS. 14 to 16), it is necessary to dispose a third pipe 206 and a fourth pipe 20 in the second pipe 203 comprising a discharge port 205 formed to exchange heat between the substance M and the hot water P. Accordingly, the diameter of the second pipe 203 must be enlarged in order to allow the desired amount of the melt to flow inside the second pipe 203, and be discharged from the discharge port 205. As a result, a situation may arise in which the heat exchanger 200 cannot be inserted into the hole of the valve attached to the flexible tank T. In this case, in order to attach the heat exchanger 200 to the tank T, it is necessary, for example, to remove the existing valve from the tank T, attach a custom-made valve with a large hole to the tank T, and then insert the heat exchanger 200 into the hole of the valve. Such work may require a great deal of effort and cost.

The present invention was made in consideration of these matters. An object of the present invention is to provide a melting device for discharging a melt of a substance into a tank to melt the substance stored in the tank, the melting device being capable of discharging a desired amount of the melt into the tank, while reducing the diameter of a discharge pipe for discharging the melt of the substance; and to provide a method for melting the substance stored in the tank by using the melting device. Another object of the present invention is to provide a double pipe for discharging a melt of a substance into a tank to melt the substance stored in the tank, the double pipe being capable of discharging a desired amount of the melt into the tank while keeping the diameter of the pipe for discharging the melt small.

Solution to Problem

In order to achieve the above object, the present invention includes the subject matter listed in the following items.
Item 1. A melting device for discharging a melt of a substance into a tank to melt the substance stored in the tank, the device comprising
  a suction pipe attached to the wall of the tank;
  a discharge pipe attached to the wall of the tank;
  a circulation flow path disposed on the outside of the tank; and
  a hopper in which the melt of the substance is to be stored and that is connected to the circulation flow path via an on-off valve;
wherein
  the inside of the tank communicates with the inside of one end of the circulation flow path through the inside of the suction pipe;

the inside of the tank communicates with the inside of the other end of the circulation flow path through the inside of the discharge pipe;

a pump is disposed at a midway position of the circulation flow path; by driving the pump, the melt of the substance that is present in the tank is suctioned into the suction pipe, circulated through the circulation flow path, and discharged from inside the discharge pipe into the tank; and the entire inside of the discharge pipe is used as a flow path for the melt;

the hopper comprises a primary-side hopper and a secondary-side hopper;

the primary-side hopper is connected to the primary side of the pump in the circulation flow path via a primary-side on-off valve;

the secondary-side hopper is connected to the secondary side of the pump in the circulation flow path via a secondary-side on-off valve; and the pump is capable of pumping a fluid in a reverse direction.

Item 2. The melting device according to Item 1, wherein
a metal pipe is wound around the outer circumference of the hopper; and
steam or hot water is allowed to flow inside the metal pipe with the substance being placed in the hopper to thereby melt the substance in the hopper and store the melt in the hopper.

Item 3. A melting device for discharging a melt of a substance into a tank to melt the substance stored in the tank,
the device comprising
a suction pipe attached to the wall of the tank;
a discharge pipe attached to the wall of the tank; and
a circulation flow path disposed outside the tank;
wherein
the inside of the tank communicates with the inside of one end of the circulation flow path through the inside of the suction pipe;
the inside of the tank communicates with the inside of the other end of the circulation flow path through the inside of the discharge pipe;
a pump is disposed at a midway position of the circulation flow path; by driving the pump, the melt of the substance that is present in the tank is suctioned into the suction pipe, circulated through the circulation flow path, and discharged from inside the discharge pipe into the tank; and the entire inside of the discharge pipe is used as a flow path for the melt;
the discharge pipe comprising a mixing ejector comprising a nozzle and a diffuser;
the nozzle ejecting the melt sent through the circulation flow path into the diffuser,
the diffuser suctioning the melt present in the tank by a pressure decrease due to injection of the melt from the nozzle, and ejecting the suctioned melt into the tank together with the melt injected from the nozzle.

Item 4. A method for melting a substance stored in a tank by using a melting device,
the melting device being configured to discharge a melt of a substance into the tank to melt the substance stored in the tank,
the device comprising:
a suction pipe attached to the wall of the tank;
a discharge pipe attached to the wall of the tank;
a circulation flow path disposed outside the tank; and
a hopper in which the melt of the substance is to be stored and that is connected to the circulation flow path via an on-off valve;
wherein
the inside of the tank communicates with the inside of one end of the circulation flow path through the inside of the suction pipe;
the inside of the tank communicates with the inside of the other end of the circulation flow path through the inside of the discharge pipe;
a pump is disposed at a midway position of the circulation flow path; by driving the pump, the melt of the substance that is present in the tank can be suctioned into the suction pipe, circulated through the circulation flow path, and discharged from inside the discharge pipe into the tank; and the entire inside of the discharge pipe is used as a flow path for the melt; and
the method comprising the steps of
taking out a part of the substance solidified in the tank;
storing in the hopper a melt obtained by melting the substance taken out from the tank;
driving the pump with the on-off valve being open to supply the melt stored in the hopper into the discharge pipe through the circulation flow path and discharging the melt from the opening at the tip of the discharge pipe into the tank, whereby the substance present in the vicinity of the discharge pipe among the substance present in the tank is melted to form a melt; and
driving the pump with the on-off valve being closed to suction the melt present in the tank into the suction pipe and supply the melt into the discharge pipe through the circulation flow path, and discharge the melt from the opening at the tip of the discharge pipe into the tank to thereby melt the substance present in an unmelted state in the tank.

Item 5. A double pipe for discharging a melt of a substance into a tank to melt the substance stored in the tank,
the double pipe comprising
an outer pipe;
an inner pipe that passes inside the outer pipe; and
a coupling;
wherein
the inside of the tank communicates with the inside of one end of the circulation flow path through a space outside of the inner pipe in the outer pipe; the inside of the tank communicates with the inside of the other end of the circulation flow path through the inside of the inner pipe;
a pump disposed at a midway position of the circulation flow path is driven, whereby the melt of the substance that is present in the tank can be suctioned into a space outside of the inner pipe in the outer pipe, circulated through the circulation flow path, and discharged from the inside of the inner pipe into the tank; the entire inside of the inner pipe is used as a flow path for the melt;
the coupling comprises a cylindrical coupling body and a lever that is tiltably
attached to the coupling body;
the base end side of the coupling body is covered with the tip side of the outer pipe;
by tilting the lever, the degree of projection of the lever to the inside of the coupling body can be reduced; and by tilting the lever in the opposite direction, the degree of projection of the lever to the inside the coupling body can be increased;
the inner pipe passes through the inside of the outer pipe and the inside of the coupling body; the base end side of the inner pipe extends from the base end side position of the outer pipe; at the base end side of the outer pipe, the gap between the outer pipe and the inner pipe is blocked by an annular member; and the tip side of the inner pipe extends from the tip of the coupling body.

Item 6. The double pipe according to Item 5, which is a combination of a first member and a second member,
the first member comprising a base end side of the outer pipe, the annular member, and the inner pipe,
the second member comprising the tip side of the outer pipe and the coupling,
wherein
a first flange is provided on the base end side of the outer pipe, and a second flange is provided on the tip side of the outer pipe,
the first flange and the second flange each project radially outwardly of the outer pipe and extend in the circumferential direction of the outer pipe,
the first flange and the second flange are butt-jointed and bolted together to combine the first member and the second member, thus forming the double pipe; and by unfastening the bolts, the double pipe can be disassembled into the first member and the second member.

Item 7. A melting device for discharging a melt of a substance into a tank to melt the substance stored in the tank,
the device comprising
a suction pipe attached to the wall of the tank;
a discharge pipe attached to the wall of the tank; and
a circulation flow path disposed outside the tank,
wherein
the inside of the tank communicates with the inside of one end of the circulation flow path through the inside of the suction pipe; and the inside of the tank communicates with the inside of the other end of the circulation flow path through the inside of the discharge pipe;
a pump is provided at a midway position of the circulation flow path; by driving the pump, the melt of the substance that is present in the tank can be suctioned into the suction pipe, circulated through the circulation flow path, and discharged from inside the discharge pipe into the tank; and the entire inside of the discharge pipe is used as a flow path for the melt;
the substance is a wax or oil/fat; and
the tank is made of a vinyl compound or a metal and does not comprise a means for cooling the substance stored inside.

Item 8. The melting device according to Item 7, wherein the discharge pipe having a small diameter is disposed inside of the suction pipe having a large diameter, and the inside of the tank communicates with the inside of one end of the circulation flow path through a space outside of the discharge pipe in the suction pipe.

Item 9. The melting device according to Item 7, further comprising a hopper in which a melt of a substance can be stored, wherein the hopper is connected to the circulation flow path via an on-off valve.

Item 10. The melting device according to Item 9, wherein
a metal pipe is wound around the outer circumference of the hopper; and
steam or hot water is allowed to flow inside of the metal pipe with the substance being placed in the hopper to thereby melt the substance in the hopper and store the melt in the hopper.

Item 11. The melting device according to Item 7, comprising a heating means that is buried in the wall of the tank.

Item 12. The melting device according to Item 7, comprising a heating means that is disposed outside the tank and abuts the wall of the tank.

Item 13. The melting device according to Item 7, comprising a heating means disposed inside of the tank.

Item 14. The melting device according to any one of Items 11 to 13, wherein the heating means is a tubular body through which hot water or steam is allowed to flow.

Item 15. The melting device according to any one of Items 11 to 13, wherein the heating means is a pad with a conductor that generates heat through electrical resistance.

Item 16. The melting device according to any one of Items 11 to 13, wherein the direction of the discharge pipe is adjusted so that the melt discharged from the inside of the discharge pipe into the tank is directed to the position of the heating means.

Item 17. The melting device according to Item 7, comprising a melt heating means that is disposed at a midway position in the circulation flow path and that heats the melt flowing through the circulation flow path.

Item 18. The melting device according to Item 7, wherein a spray nozzle through which the melt is sprayed is attached to the tip of the discharge pipe.

Item 19. The melting device according to Item 7, further comprising a gas supply means capable of supplying heated gas to the circulation flow path.

Item 20. A double pipe for discharging a melt of a substance into a tank to melt the substance stored in the tank,
the double pipe comprising
an outer pipe and
an inner pipe that passes through the outer pipe;
wherein
the inside of the tank communicates with the inside of one end of the circulation flow path through a space outside of the inner pipe in the outer pipe; and the inside of the tank communicates with the inside of the other end of the circulation flow path through the inside of the inner pipe;
by driving a pump disposed at a midway position of the circulation flow path, the melt of the substance that is present in the tank can be suctioned into a space outside of the inner pipe in the outer pipe, circulated through the circulation flow path, and discharged from the inside of the inner pipe to the inside of the tank; and the entire inside of the inner pipe is used as a flow path for the melt;
the substance is a wax or fat/oil;
the tank is made of vinyl or a metal; and
the tank does not have a means for cooling the substance stored inside.

Advantageous Effects of Invention

According to the melting device and the melting method of the present invention, the entirety of the inside of the discharge pipe is used as a flow path for the melt, whereby the desired amount of the melt can be discharged from the discharge pipe while the diameter of the discharge pipe is kept small.

Further, according to the double pipe of the present invention, the entirety of the inside of the inner pipe is used as a flow path for the melt of the substance, whereby the desired amount of the melt can be discharged into the tank while the diameter of the inner pipe for discharging the melt is kept small.

BRIEF DESCRIPTION OF DRAWINGS

FIG. 3(a) is a diagrammatic perspective view, and FIG. 3(b) is a cross-sectional view.

FIG. 3(a) is a diagrammatic perspective view, and FIG. 3(b) is a cross-sectional view.

DESCRIPTION OF EMBODIMENTS

Figure 1:
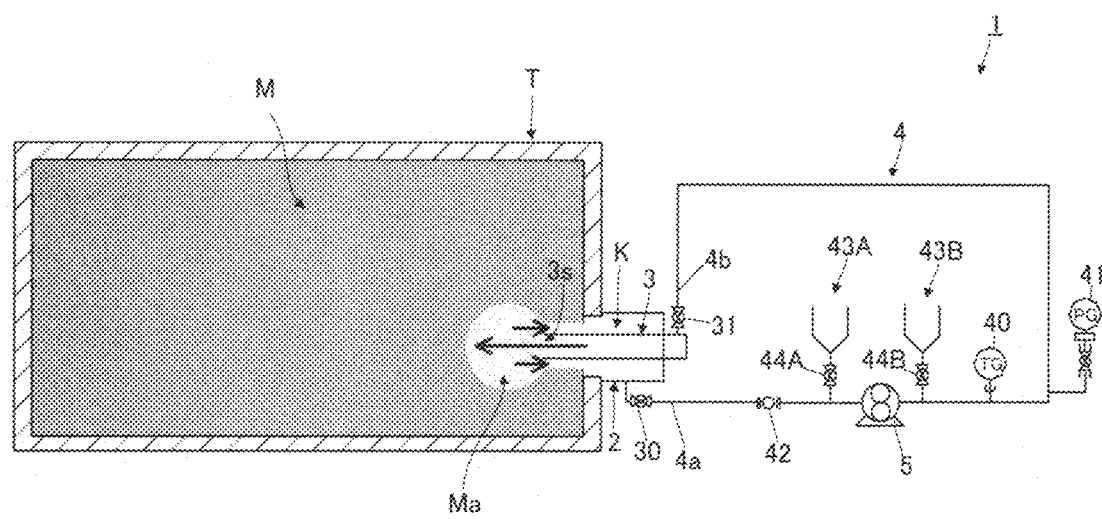
FIG. 1 is a schematic diagram showing the melting device according to an embodiment of the present invention.
Figure 2:
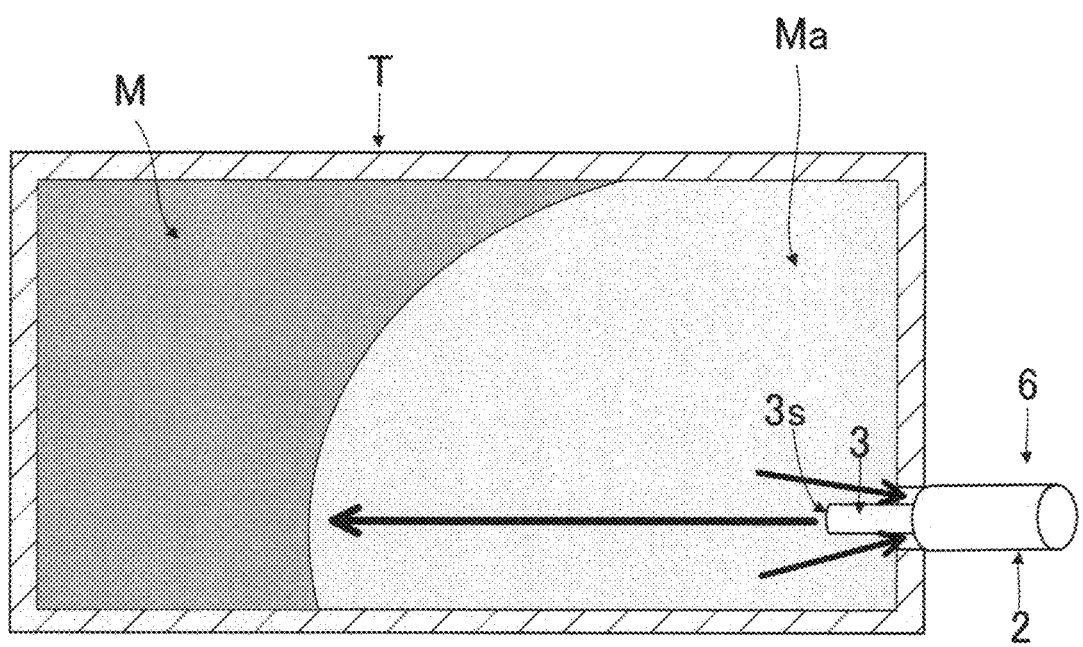
FIG. 2 is a schematic diagram showing the internal state of the tank to which the melting device according to an embodiment of the present invention is applied.

Embodiments of the present invention are described below with reference to the accompanying drawings. FIG. 1 is a schematic diagram of the melting device 1 according to an embodiment of the present invention. FIG. 2 is a schematic diagram showing the internal state of a tank T to which the melting device 1 of this embodiment is applied.

The melting device 1 according to this embodiment discharges a melt Ma of substance M into a tank T in order to melt the substance M stored in the tank T. The tank T is a flexible tank made of vinyl, and is filled with a substance M that is solid at ordinary temperature. The substance M is, for example, wax, or fat/oil (an ester of glycerin and fatty acid).

As shown in FIG. 1, the melting device 1 comprises a suction pipe 2 and a discharge pipe 3, which are attached to the wall of the tank T, a circulation flow path 4, which is disposed outside the tank T, and a pump 5, which is disposed at a midway position of the circulation flow path 4. In the melting device 1, the inside of the tank T communicates with the inside of one end 4a of the circulation flow path 4 through the inside of the suction pipe 2, whereas the inside of the tank T communicates with the inside of the other end 4b of the circulation flow path 4 through the inside of the inner pipe 3. By driving the pump 5, the melt Ma of substance M that is present in the tank T can be suctioned into the suction pipe 2, circulated through the circulation flow path 4, supplied into the discharge pipe 3, and dis-charged into the tank T through the opening 3s at the tip of the discharge pipe 3. By the heat of the melt Ma that is discharged into the tank T, the unmelted substance M that is present in the tank T is melted, and becomes a melt Ma. Further, the melt Ma is suctioned into the suction pipe 2 and discharged into the tank T, whereby the unmelted substance M that is present in the tank T melts into a melt Ma. The configuration of the melting device 1 is specifically described below.

Figure 3:
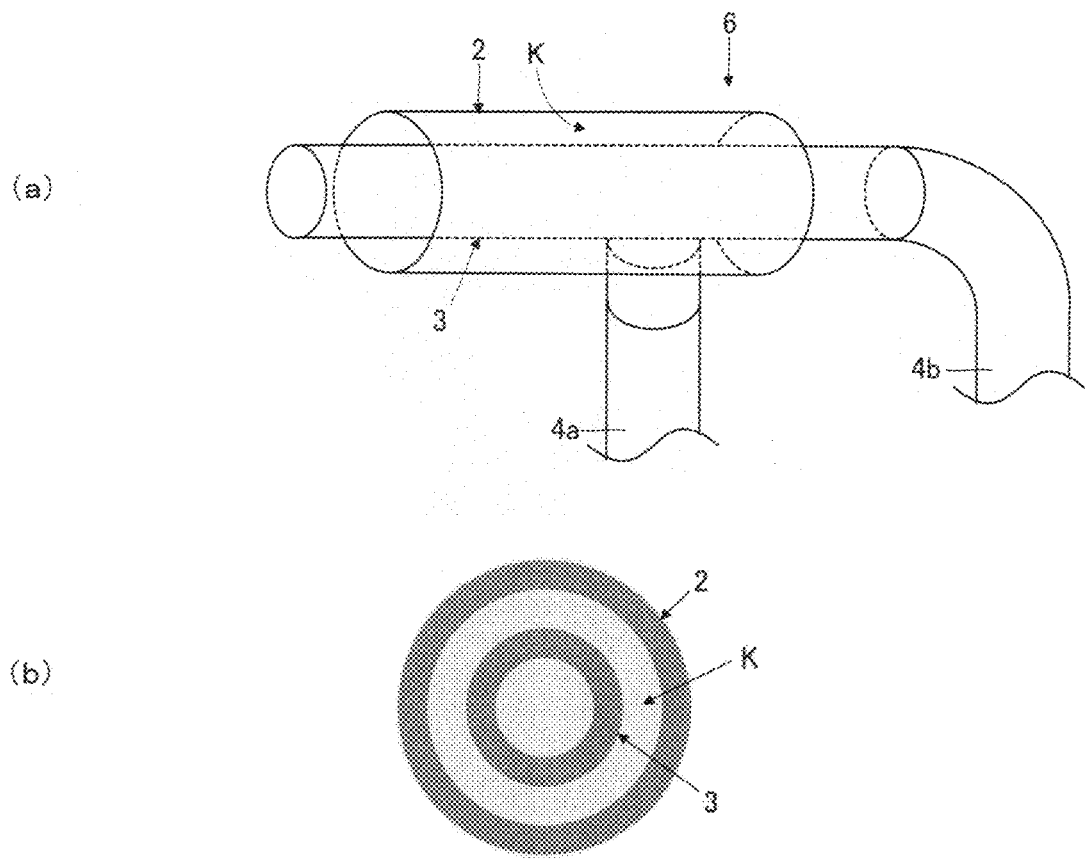
FIG. 3 is a schematic diagram of a suction pipe and a discharge pipe.

FIG. 3 is a schematic diagram showing a double pipe 6 according to the present embodiment. FIG. 3(a) is a diagrammatic perspective view, and FIG. 3(b) is a cross-sectional view. The melting device 1 of this embodiment is provided with a double pipe 6 comprising an outer pipe that constitutes a suction pipe 2 and an inner pipe that constitutes a discharge pipe 3 (hereinafter the reference numeral "2" for the suction pipe is used as a reference numeral for the outer pipe, and the reference numeral "3" for the discharge pipe is used as a reference numeral for the inner pipe).

The double pipe 6 is one in which an inner pipe 3 (discharge pipe) passes through the inside of an outer pipe 2. The inside of the tank T communicates with the inside of one end 4a of the circulation flow path 4 through the space K outside the inner pipe 3 (discharge pipe) in the outer pipe 2 (suction pipe). The inside of the tank T communicates with the inside of the other end 4b of the circulation flow path 4 through the inside of the inner pipe 3 (discharge pipe) (FIG. 1). According to the melting device 1 comprising the double pipe 6, a pump 5 provided in the circulation flow path 2 is driven, whereby the melt Ma of substance M that is present in the tank T can be suctioned into the space K, circulated through the circulation flow path 4, and discharged from the inside of the inner pipe 3 (discharge pipe) to the inside of the pipe T. The space K and the entirety of the inside of the inner pipe 3 (discharge pipe) are used as a flow path for the melt Ma.

Figure 4:
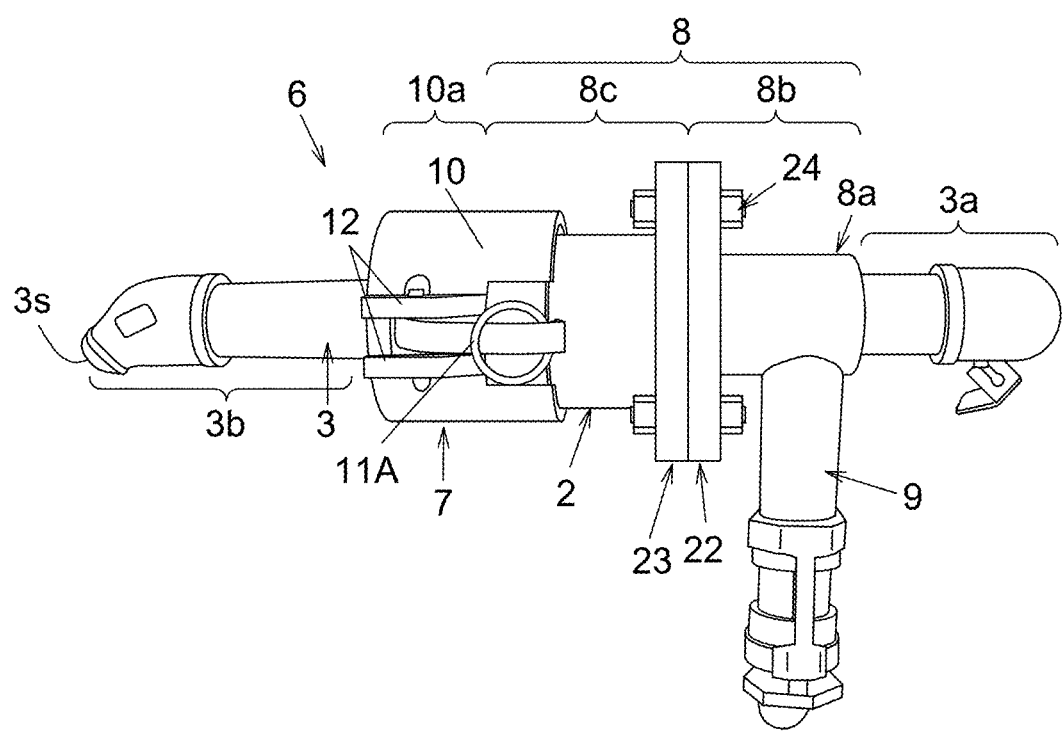
FIG. 4 is an image showing a double pipe that constitutes a suction pipe and a discharge pipe.
Figure 5:
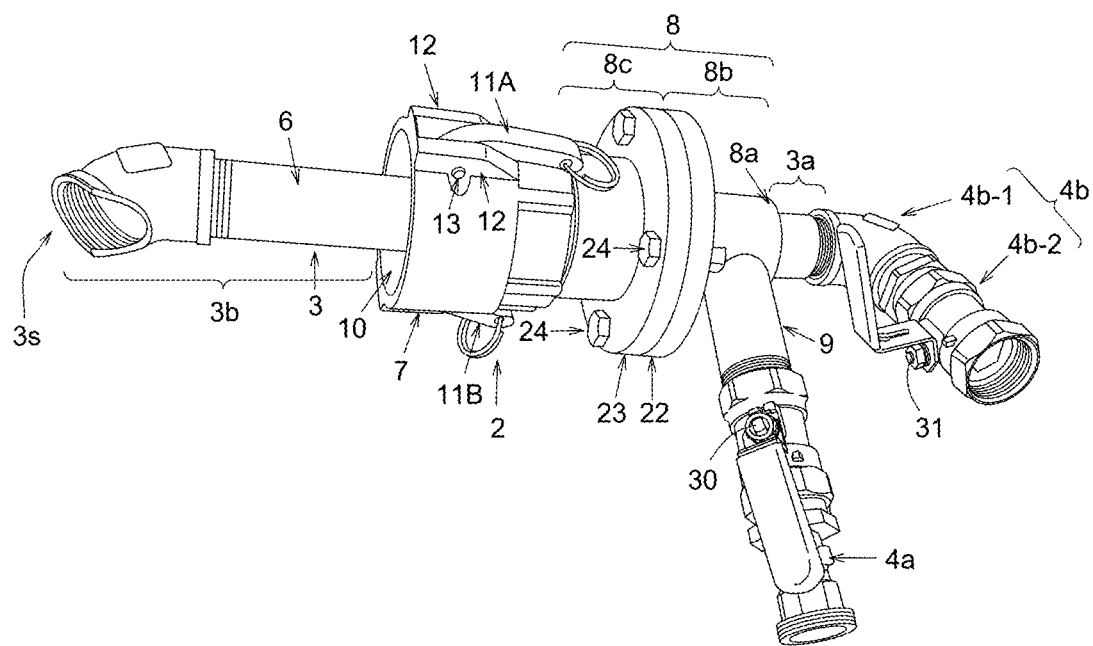
FIG. 5 is an image showing a double pipe that constitutes a suction pipe and a discharge pipe.
Figure 6:
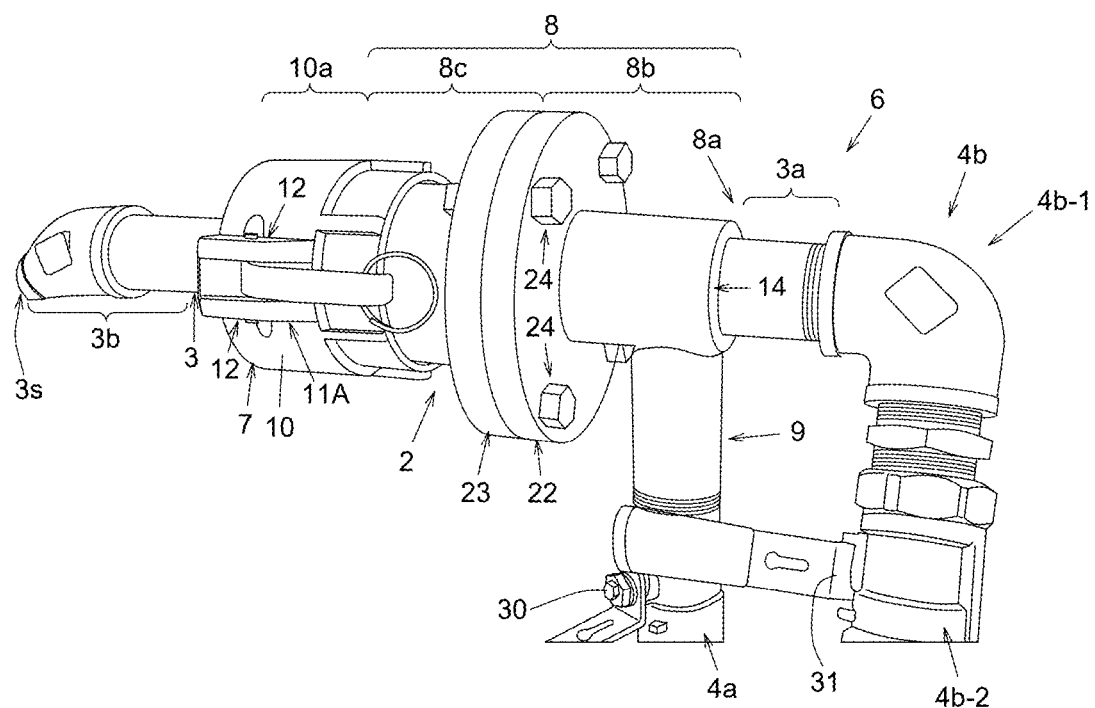
FIG. 6 is an image showing a double pipe that constitutes a suction pipe and a discharge pipe.

FIGS. 4 to 6 are images showing an example of the double pipe 6 described above. The double pipe 6 shown in FIGS. 4 to 6 is formed of an outer pipe 2, which is a suction pipe, an inner pipe 3, which is a discharge pipe, and a coupling 7.

The outer pipe 2 and inner pipe 3 are made of metal such as stainless steel or resin (in the examples shown in the figures, the outer pipe 2 and inner pipe 3 are made of stainless steel (SUS304 JIS5K)).

As shown in FIGS. 4 to 6, the outer pipe 2 (suction pipe) comprises an outer pipe body 8 and a base pipe 9. The base pipe 9 extends from the base end side 8b of the outer pipe body 8, and the direction of extension of the base pipe 9 is inclined to the extension direction of the outer pipe body 8. In the Examples shown in FIGS. 4 to 6, the direction of extension of the base pipe 9 is perpendicular to the direction of extension of the outer pipe body 8. However, the direction does not have to be perpendicular.

Figure 7:
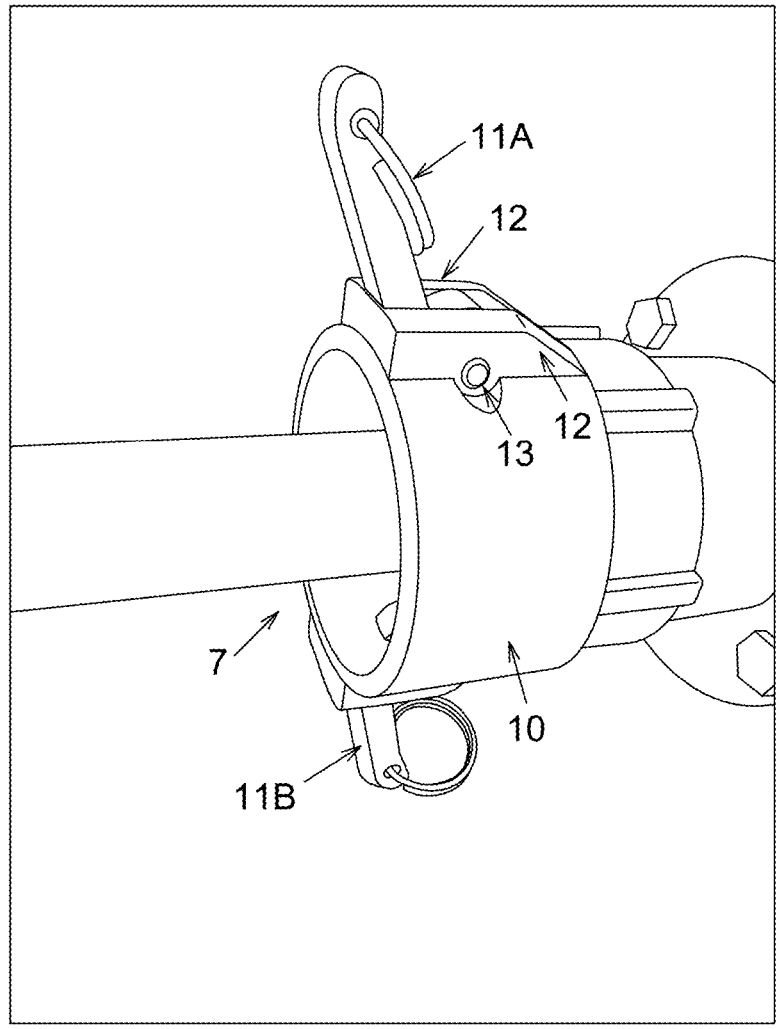
FIG. 7 is an image showing a coupling provided on the double pipe.
Figure 8:
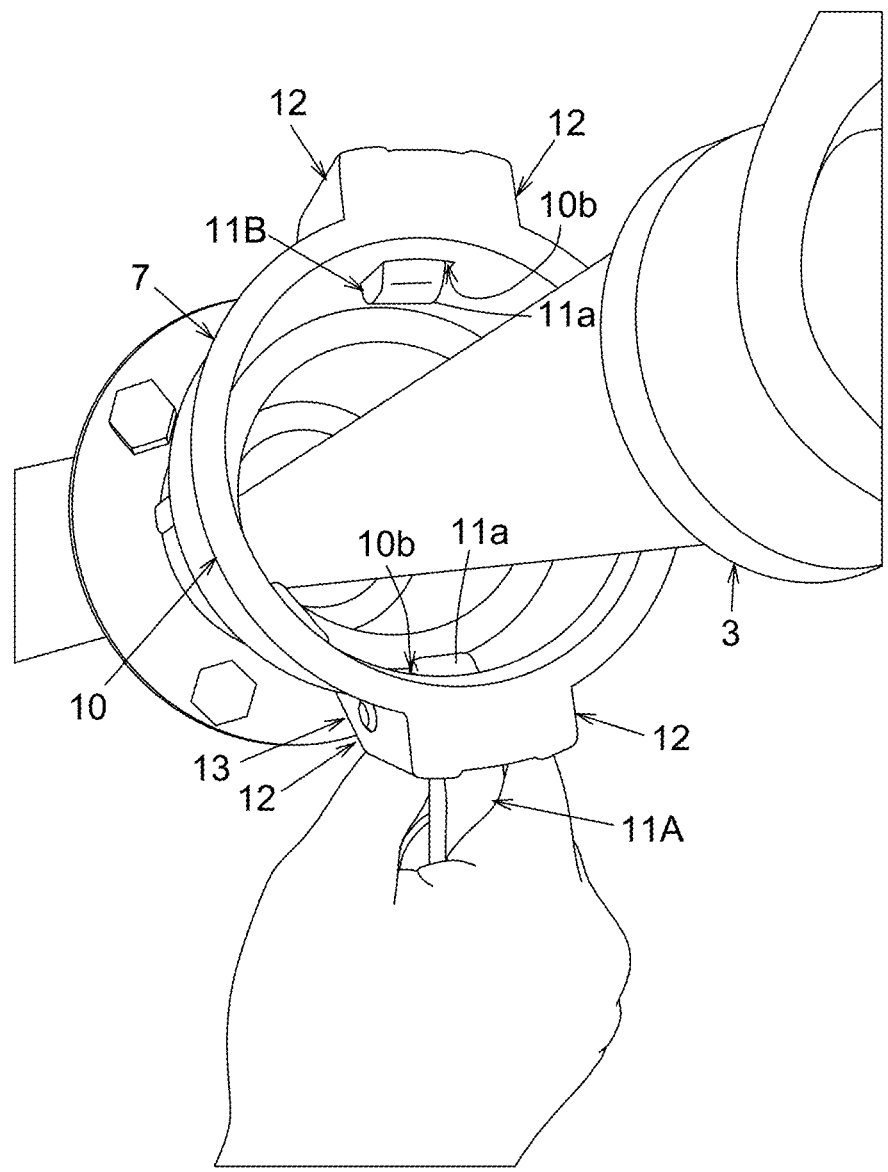
FIG. 8 is an image showing a coupling provided on the double pipe.

FIG. 7 and FIG. 8 are enlarged images of the coupling 7. The coupling 7 has a cylindrical coupling body 10 and two levers 11A and 11B that are tiltably attached to the coupling body 10. The coupling body 10 has a cylindrical shape with openings at both ends, and is formed from resin. The base end side of the coupling body 10 is covered with the tip side of the outer pipe 2 (tip side 8c of the outer pipe body 8) (FIG. 4 to FIG. 6). More specifically, the tip side 8b of the outer pipe body 8 is inserted into the inside of the base end side of the coupling body 10, and the screw formed on the inner surface of the coupling body 10 is screwed to the screw formed on the outer surface of the outer pipe body 8, thereby fixing the base end side of the coupling body 10 to the tip side 8b of the outer pipe body 8. The coupling body 10 may also be fixed to the outer pipe body 8 by any known means other than screws. The coupling body 10 may be made of rubber or a metal.

Two pairs of projections 12, 12 are provided on the outer surface of the coupling body 10 (FIG. 8). The two sets of projections 12, 12 are provided at relative positions in the radial direction, and a shaft member 13 is attached to each set of projections 12, 12. The shaft member 13 extends from one projection 12 to the other projection 12.

One end side 11a of the lever 11 is inserted between each pair of projections 12, 12, and the shaft member 13 penetrates one end side 11a of the lever 11. In the coupling body 10, a through-hole 10b (FIG. 8) is formed between the projections 12, 12. This through-hole 10b extends radially inwardly from the outer surface of the coupling body 10 and opens on the inner surface of the coupling body 10, and one end side 11a of the lever is inserted inside the through-hole 10b. By grasping the other end side of the lever 11, as shown in the lower lever 11A in FIG. 8, and tilting the lever 11, the degree to which the one end side 11a of the lever 11 projects from the through-hole 10b to the inside of the coupling body 10 can be reduced. By tilting the lever 11 in the opposite direction, the degree to which the one end side 11a of the lever 11 projects from the through-hole 10b to the inside of the coupling body 10 can be increased, as in the upper lever 11B shown in FIG. 8.

The inner pipe 3 (discharge pipe) passes through the inside of the outer pipe body 8 and the inside of the coupling body 10. The inside of the base pipe 9 communicates with the space outside the inner pipe 3 (equivalent to the space K shown in FIG. 3) in the outer pipe body 8 and the coupling body 10.

As shown in FIGS. 4 to 6, the base end side 3a of the inner pipe 3 extends from the base end position of the outer pipe 2 (specifically, the position of the base end 8a of the outer pipe body 8). As shown in FIG. 6, at the base end position of the outer pipe 2 (the position of the base end 8a of the outer pipe body 8), the gap between the outer pipe body 8 and the inner pipe 3 is closed by an annular member 14 (the outer peripheral edge of the annular member 14 is welded to the outer pipe body 8, and the inner peripheral edge of the annular member 14 is welded to the inner pipe 3). The tip side 3b of the inner pipe 3 (FIG. 4 to FIG. 6) extends from the tip of the coupling body 10.

The double pipe 6 disclosed above is a combination of two components (first and second components). The first member comprises a base end side of the outer pipe 2 (specifically, a base end side 8b of the outer pipe body 8 and the base end pipe 9), the annular member 14 (FIG. 6), and the inner pipe 3. The second member comprises a tip side of the outer pipe 2 (specifically a tip side 8c of the outer pipe body 8) and a coupling 7. A first flange 22 is provided on the base end side 8b of the outer pipe body 8, and a second flange 23 is provided on the tip side 8c of the outer pipe body 8. These flanges 22 and 23 project radially outwardly of the outer pipe body 8, and extend in the circumferential direction of the outer pipe body 8. The first flange 22 and the second flange 23 are butt-jointed and bolted together with bolts 24 to combine the first member and the second member, thus forming a double pipe 6. The double pipe 6 can be disassembled into the first member and the second member by unfastening the bolts 24.

The circulation flow path 4 (FIG. 1) is formed by connecting, for example, flexible metal hoses (diameter: 32A) made of SUS304. To connect the above flexible metal hoses to each other, for example, connection fittings specified in JIS 10K can be used.

When the double pipe 6 shown in FIG. 4 to FIG. 6 is used, the pipe that constitutes one end 4a of the circulation flow path 4 (FIG. 1, FIG. 5, FIG. 6) is connected to the base end side (more specifically, the base pipe 9) of the outer pipe 2 (suction pipe), so that the "inside of the tank T" and the "inside of one end 4a of the circulation flow path 4" communicate with each other through the "inside of the outer pipe 2" (the "inside of the outer pipe 2" corresponds to the "inside of the base pipe 9" and "the space outside the inner pipe 3 in the outer pipe body 8 and the coupling body 10"). The pipe that constitutes the other end 4b of the circulation flow path 4 (FIG. 1, FIG. 5, and FIG. 6) is connected to the base end of the inner pipe 3 (discharge pipe), and the "inside of the tank T" and the "inside of the other end 4b of the circulation flow path 4" communicate with each other through the "inside of the inner pipe 3 (discharge pipe). As shown in FIG. 1, FIG. 5, and FIG. 6, a first on-off valve 30 is provided on the pipe that constitutes one end 4a of the circulation flow path 4. A second on-off valve 31 is provided on the pipe that constitutes the other end 4b of the circulation flow path 4. In the example shown in FIGS. 5 and 6, the other end 4b of the circulation flow path 4 is composed of an L-shaped joint pipe 4b-1 and a straight pipe 4b-2. A second on-off valve 31 is provided in the straight pipe 4b-2. The base end of the inner pipe 3 is connected to one end of the coupling pipe 4b-1 by a screw, and the other end of the coupling pipe 4b-1 is connected to one end of the straight pipe 4b-2 by a screw. The coupling pipe 4b-1 may be omitted, and the base end of the inner pipe 3 may be connected by a screw or the like to the straight pipe 4b-2 to which the second on-off valve 31 is attached.

The base pipe 9 may be omitted from the outer pipe 2, and the pipe that constitutes one end 4a of the circulation flow path 4 may be connected to the base end side 8b of the outer pipe body 8. In this case, the "inside of the tank T" and the "inside of one end 4a of the circulation flow path 4" communicate with each other through the "space outside the inner pipe 3 in the outer pipe body 8 and the coupling body 10." The first member described above comprises the base end side 8b of the outer pipe body 8 (the base end side of the outer pipe 2), an annular member 14 (FIG. 6), and the inner pipe 3.

According to this embodiment, a pump capable of reversing the fluid pumping direction is provided as a pump 5 disposed at a midway position of the circulation flow path 4 (FIG. 1). This pump can be, for example, a rotary pump.

The circulation flow path 4 (FIG. 1) is further provided with a thermometer 40, a pressure gauge 41, a sight glass 42, a primary-side hopper 43A, and a secondary-side hopper 43B, in addition to the pump 5 described above. The pressure gauge 41 measures the pressure of the melt Ma of substance M that is pumped through the circulating flow path 4 by the pump 5. The thermometer 40 measures the temperature of the melt Ma that flows through the circulation flow path 4. The sight glass 42 is a tubular body with a window made of glass, through which the state of the melt Ma flowing in the circulation flow path 4 can be checked.

The primary-side hopper 43A and the secondary-side hopper 43B are capable of storing the melt Ma of the substance M. The primary-side hopper 43A is connected to the primary side of the pump 5 in the circulation flow path 4 via the primary-side third on-off valve 44A. The secondary-side hopper 43B is connected to the secondary side of the pump 5 in the circulation flow path 4 via the secondary-side third on-off valve 44B.

According to the configuration of the melting device 1 explained above, by driving the rotary pump 5 forward with the primary-side on-off valve 30 being closed and the secondary-side on-off valve 31 and the primary-side third on-off valve 44A being open, the melt Ma stored in the primary-side hopper 43A can be circulated through the circulation flow path 4 and supplied to the inside of the inner pipe 3 (discharge opening). Furthermore, if the secondary-side third on-off valve 44B is opened, a part of the melt Ma flowing through the circulation flow path 4 can flow into the secondary-side hopper 43B, so that the state of the melt Ma can be observed.

By driving the rotary pump 5 forward with the first and second on-off valves 30 and 31 being open, the melt Ma in the tank T can be suctioned into the outer pipe 2 (suction pipe), circulated through the circulation flow path 4, supplied to the inner pipe 3 (discharge pipe), and discharged from the opening 3s of the inner pipe 3 into the tank T. Furthermore, if the third on-off valves 44A, 44B are opened, a part of the melt Ma flowing in the circulation flow path 4 can flow into the hoppers 43A, 43B, so that the condition of the melt Ma can be observed.

By driving the rotary pump 5 in reverse with the first and second on-off valves 30 and 31 being open, the melt Ma in the circulation flow path 4 can be allowed to flow in the opposite direction. In other words, the melt Ma in the tank T can be suctioned into the inner pipe 3, circulated through the circulation flow path 4, and discharged into the tank T from the space K outside the inner pipe 3 in the outer pipe 2.

Next, the method for melting a substance M that has solidified in the tank T by using the melting device 1 according to this embodiment is explained.

Figure 9:
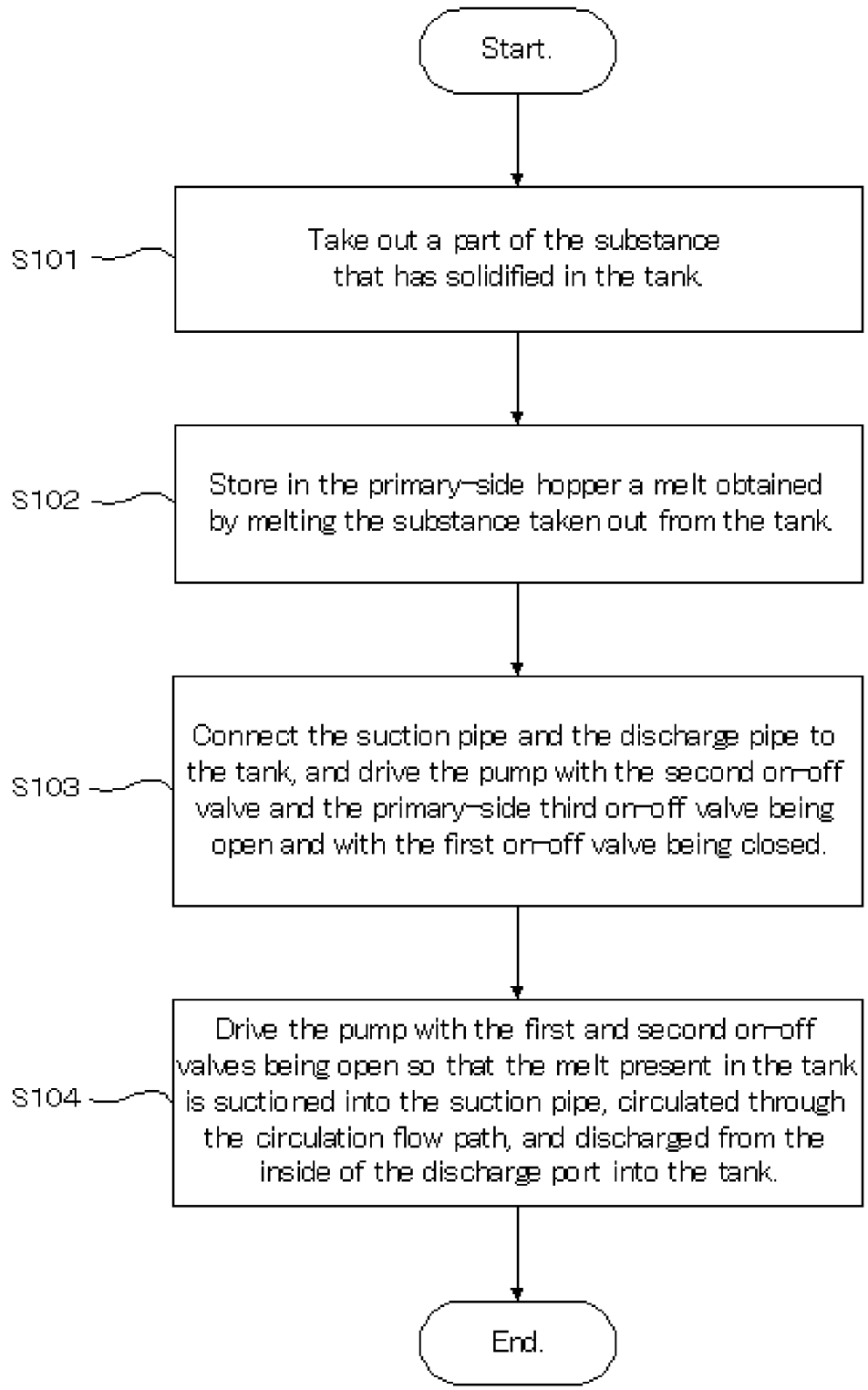
FIG. 9 is a flowchart showing the melting method of the present invention.

First, the step of taking out a part of the substance M that has solidified in the tank T is preformed (step S101 in FIG. 9).

Figure 10:
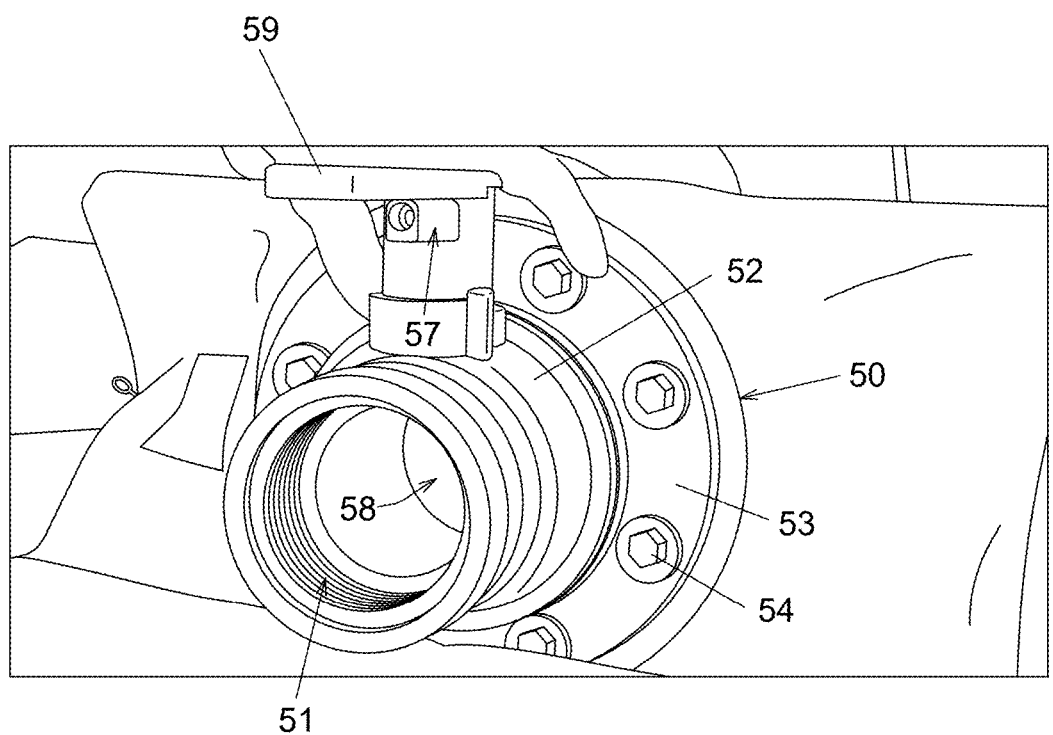
FIG. 10 is an image showing a valve provided on the flexible tank.
Figure 11:
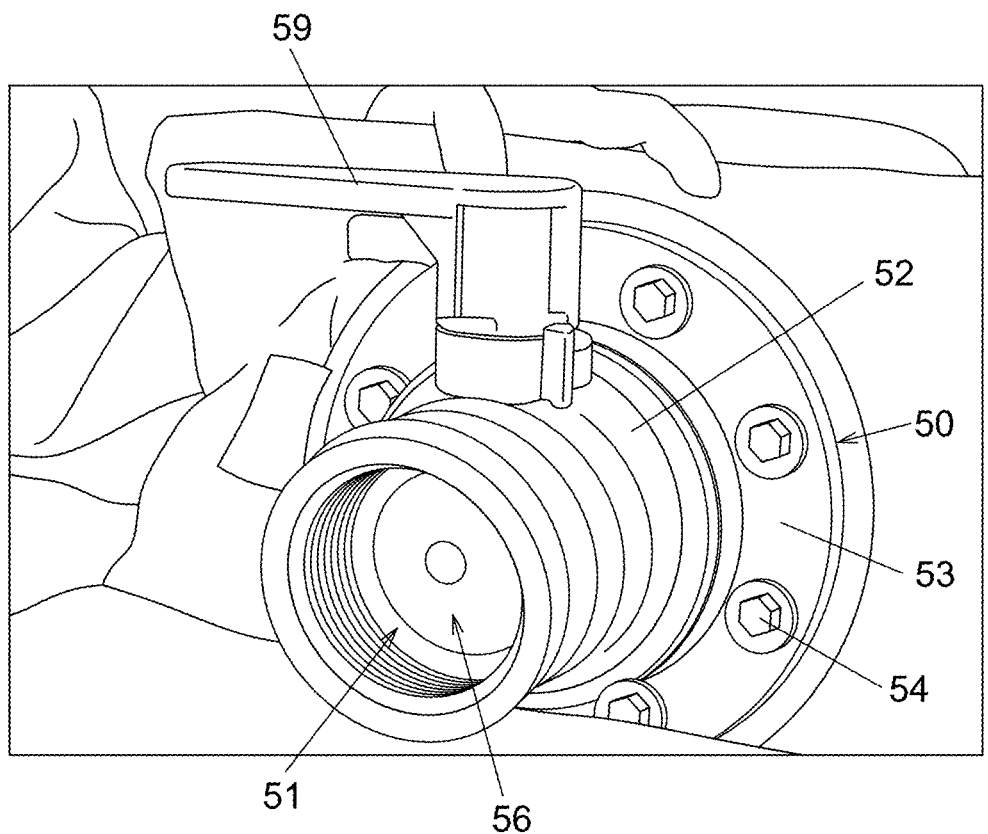
FIG. 11 is an image showing a valve provided on the flexible tank.

Here, if the tank T is a general flexible tank and the valve 50 shown in FIGS. 10 and 11 is attached to the wall of the tank T, a part of the substance M that has solidified in the tank T is taken out from the hole 51 of the valve 50. The structure of the valve 50 is described below.

The valve 50 comprises a cylinder 52 and an annular member that is not shown in the figure. An annular flange 53 is provided at the base end of the cylinder 52. The flange 53 projects radially outwardly of the cylinder 52 and extends in the circumferential direction of the cylinder 52.

The annular member, which is not shown in the figure, has an outer diameter that is equal to the outer diameter of the flange 53, and an inner diameter that is equal to the inner diameter of the cylinder 52. At the position of the tank T to which the valve 50 is attached, a through-hole (not shown) is formed in the wall of the tank T. The diameter of the through-hole is substantially equal to the inner diameter of the cylinder 52 and the annular member.

When the valve 50 is attached to the tank T, the flange 53 is fasten to the annular member by bolts 54 (the bolts 54 penetrate the wall of the tank T) while the space inside the cylinder 52, the through-hole formed in the wall of the tank T, and the space inside the annular member communicate with each other and the wall of the tank T is interposed between the flange 53 and the annular member (the bolts 54 penetrate the wall of the tank T). The "hole 51 of the valve" described above is formed by connection of the "space inside the cylinder 52," the "through-hole formed in the wall of the tank T," and the "space inside the annular member."

As shown in FIGS. 10 and 11, the cylinder 52 is provided with a ball 56 and a lever 57 that is fastened to the ball 56. The ball 56 is a hollow sphere and is placed inside the cylinder 52. Two through-holes 58, 58 are formed in the wall of the ball 56 (hollow sphere) (one through-hole 58 is shown in FIG. 10). The two through-holes 58, 58 oppose each other in the radial direction of the ball 56, and the diameters of the through-holes 58, 58 are substantially equal to the inner diameter of the cylinder 52. A lever 57 extends from the ball 56 radially outwardly of the cylinder 52 and penetrates the cylinder 52, and a handle 59 is provided at the tip of the lever 57 extending from the cylinder 52.

According to the valve 50 described above, by grasping the handle 59 and rotating the lever 57, the ball 56 can be rotated in the cylinder 52 to dispose the two through-holes 58, 58 on the axis of the cylinder 52. By performing this operation, the hole 51 of the valve 50 can be opened as shown in FIG. 10. Further, by rotating the lever 57 to rotate the ball 56, the position of the through-holes 58, 58 can be changed to close the hole 51 of the valve 50 by the wall of the ball 56 as shown in FIG. 11.

When the valve 50 is provided in the tank T, the first operation in step S101 is to open the hole 51 of the valve 50 by rotating the lever 57 (to make the valve 50 in the state shown in FIG. 10). Subsequently, a hand drill (not shown) is inserted into the tank T through the hole 51 of the valve 50. By rotating the hand drill, a part of the material M that has solidified inside the tank T is scraped off. After this, the hand drill is withdrawn from the hole 51 of the valve 50, whereby the material M scraped by the hand drill is taken out of the tank T. The method of taking out the substance M from the tank T in step S101 is not limited to the method described above. For example, if the tank T is provided with a removable lid, the lid may be removed and the substance M in the tank T may be taken out.

After step S101, the melt Ma obtained by melting the substance M taken out from the tank T is stored in the primary-side hopper 43A (step S102 in FIG. 9).

In step S102, for example, the substance M taken out from the tank T is melted with a heater (a stove etc.), and the melt Ma obtained from this melt is fed into the primary-side hopper 43A. Alternatively, a metal pipe may be wound around the outer peripheral surface of the primary-side hopper 43A to melt the substance M in the primary-side hopper 43A. In this case, in step S102, steam or hot water is allowed to flow into the metal pipe with the substance M taken out from the tank T being placed in the primary-side hopper 43A. As a result, the heat of the steam or hot water melts the substance M placed into the primary-side hopper 43A, and the melt Ma is stored in the hopper 43A.

After step S102, the suction pipe 2 and the discharge pipe 3 are connected to the tank T, and the pump 5 is driven in forward rotation with the secondary-side on-off valve 31 and the primary-side third on-off valve 44A (FIG. 1) being opened and the primary-side on-off valve 30 being closed (step S103). This allows the melt Ma stored in the primary-side hopper 43A to circulate through the circulation flow channel 4 and be supplied to the inside of the discharge pipe 3 and discharged from the opening 3s of the discharge pipe 3 to the inside of the tank T. As shown in FIG. 1, the heat of the discharged melt Ma melts the substance M in the vicinity of the discharge pipe 3, within the substance M that is present in the tank T, whereby the substance becomes the melt Ma.

If the suction pipe 2 and the discharge pipe 3 are formed of a dual pipe 6 shown in FIGS. 4 to 6, and the valve 50 shown in FIGS. 10 and 11 is attached to the wall of the tank T, the suction pipe 2 and the discharge pipe 3 are attached to the wall of the tank T in step S103 by attaching the double pipe 6 to the valve 50. The step of attaching the double pipe 6 to the valve 50 is explained below.

First, as shown in the lower lever 11A in FIG. 8, the lever 11 is tilted to reduce the degree to which one end side 11a of the lever 11 projects to the inside of the coupling body 10.

Subsequently, the hole 51 of the valve 50 is made open (state shown in FIG. 10) by rotating the lever 57. The inner pipe 3 (FIGS. 4 to 8) is inserted into the hole 51 of the valve 50 to make the tip portion of the inner pipe 3 project to the inside of the tank T (FIG. 1, FIG. 2), and the tip side 10a of the coupling body 10 (FIG. 4 to FIG. 6) is covered with the cylinder 52 of the valve 50 (FIG. 10). This allows the inside of the outer pipe 2 (suction pipe) and the inside of the inner pipe 3 (discharge pipe) to individually communicate with the inside of the tank T. If the material M in the tank T is scraped off in step S101, the tip portion of the inner pipe 3 is inserted into the hole of the material M created by this scraping.

Subsequently, the "degree to which one end side 11a of the lever 11 projects to the inside of the coupling body 10" is increased by tilting the lever 11, as shown in the upper lever 11B in FIG. 8. As a result, the one end side 11a of the lever 11 is pressed strongly against the cylinder 52, whereby the double pipe 6 is attached to the valve 50.

In order to attach the double pipe 6 to the valve 50 by the above operation, it is necessary to make the outer diameter of the inner pipe 3 smaller than the inner diameter of the cylinder 52 so that the inner pipe 3 can be inserted into the cylinder 52. By making the inner diameter of the coupling body 10 substantially equal to the outer diameter of the cylinder 52, it is necessary to achieve both the insertion of the cylinder 52 into the coupling body 10 and fixing of the double pipe by abutting the lever 11 to the cylinder 52. The operation of attaching the double pipe 6 to the valve 50 (the work of connecting the suction pipe 2 and the discharge pipe 3 to the tank T) may be performed before the step S102.

If the "the degree to which one end side 11a of the lever 11 projects to the inside of the coupling body 10" is reduced by tilting the lever 11 as shown by the lower lever 11A in FIG. 8, the press force of one end side 11a of the lever 11 onto the cylinder 52 is weakened. This allows the double pipe 6 to be detached from the valve 50 (that is, the double pipe 6 (suction pipe 2 and discharge pipe 3) can be detached from the tank T).

After step S103 in FIG. 9, the pump 5 is driven forward with the first on-off valve 30 and the second on-off valve 31 being open, whereby the melt Ma that is present in the tank T can be suctioned into the suction pipe 2, circulated through the circulation flow path 4, supplied to the inside of the discharge pipe 3, and discharged from the opening 3s of the discharge pipe 3 into the tank T (Step S104). During this step S104, the substance M that is present in an unmelted state in the tank T melts due to heat of the melt Ma discharged into the tank T. More specifically, in step S104, the melt Ma previously discharged from the discharge pipe 3 and the melt Ma melted by the heat of the melt Ma are repeatedly suctioned into the suction pipe 2 and discharged from the discharge pipe 3. As a result, the amount of the melt Ma discharged from the discharge pipe 3 (i.e., the amount of the melt Ma suctioned from the suction pipe 2) increases with the lapse of time, and the range in which the substance M is melted in the tank T gradually expands from the vicinity of the discharge pipe 3 (FIG. 2).

If the temperature of the melt Ma in the tank T decreases and the substance M does not melt any more, the drive of the pump 5 is temporarily stopped to store the hot melt Ma in the primary-side hopper 43A, for example. After this, the pump 5 is driven forward with the first on-off valve 30 being closed and the second on-off valve 31 and the primary-side third on-off valve 44A being open. Since the high-temperature melt Ma can be supplied to the inside of the tank T in this way, melting of the substance M can be resumed (that is, the melt Ma stored in the hopper 43A can be used as the priming oil for resuming the melting.)

According to the melting device 1 and the double pipe 6 of this embodiment explained above, the entirety of the inside of the discharge pipe 3 (inner pipe) that discharges the melt Ma of the substance M is used as a flow path for the melt Ma. Therefore, it is possible to discharge the desired amount of the melt from the discharge pipe 3 (inner pipe) while keeping the diameter of the discharge pipe 3 (inner pipe) small. Since the diameter of the discharge pipe 3 (inner pipe) can be kept small, the hole of the existing valve in the tank T can be used as a hole for inserting the discharge pipe 3 (inner pipe). Unlike in conventional technology, it is unnecessary to remove the existing valve from the tank T, install a custom-made valve with a larger hole in the tank T instead, and insert the discharge pipe into the hole of the valve. In the present invention, the discharge pipe is a pipe inserted into a hole in the wall of the tank T and directly or indirectly attached to the wall of the tank T, while it is connected by screws or welding, etc., to a pipe that constitutes an end of the circulation flow path 4 (a coupling pipe, a pipe in which a valve is attached, etc.) and is used to discharge the melt Ma flowing through the circulation flow path 4 into the interior of the tank T. In the examples shown in FIGS. 4 to 8, the discharge pipe 3 (inner pipe) is integrated with the suction pipe 2 (outer pipe), and the suction pipe 2 (outer pipe) is attached to the valve 50 with the discharge pipe 3 (inner pipe) being inserted into the hole of the valve 50 provided in the wall of the tank T, whereby the suction pipe 2 (outer pipe) is directly attached to the wall of the tank T and the discharge pipe 3 (inner pipe) is indirectly attached to the wall of the tank T through the suction pipe 2 (outer pipe).

Furthermore, according to the melting device 1 of this embodiment, if the length of the discharge pipe 3 (inner pipe 3) extending into the tank T is shortened, the hole in the substance M, into which the tip portion of the discharge pipe 3 (inner pipe 3) is inserted, does not need to be lengthened. Therefore, the time and effort required to make holes in step S101 of FIG. 9 can be reduced. Furthermore, according to this embodiment, a melt Ma to be stored in the primary-side hopper 43A is obtained by melting the substance M obtained by making the holes, and the melt Ma is supplied to the tank T and becomes the priming oil that triggers the melting. In this way, the substance M obtained by making holes is effectively utilized and not wasted.

Further, according to the melting device 1 of this embodiment, if clogging occurs in the circulation flow path 4, suction pipe 2, or discharge pipe 3, the clogging can be removed by driving the rotary pump 5 in reverse, and allowing the melt Ma to flow in the opposite direction by pumping. Further, by connecting hoppers to the primary and secondary sides of the pump 5, one of these hoppers can be used to store the melt Ma as priming oil, whereas the other hopper can be used to sample the melt Ma flowing in the circulation flow path 4.

Further, according to the melting device 1 of this embodiment, a rotary pump 5 capable of driving in reverse is used, so that the high-temperature melt Ma stored in the secondary-side hopper 43B can be discharged from the inner pipe 3 (suction pipe 2), and the substance M in the tank T can be melted by the heat of the discharged melt Ma. Since this is possible, a metal pipe may be wound not only around the outer circumference of the primary-side hopper 43A, but also around the outer circumference of the secondary-side hopper 43B. With this configuration, the substance M fed into the secondary-side hopper 43B can be melted and the melt Ma can be stored in the secondary-side hopper 43B by allowing steam or hot water to flow inside the metal pipe.

If a metal pipe is wound around the hopper 43A or 43B and when the melting device 1 is disposed in a low-temperature environment (e.g., a cold region, etc.), the circulation flow path 4 can be heated by the heat of the steam or hot water by allowing steam or hot water to flow inside of the metal pipe. This can prevent freezing of the melt Ma that flows through the circulation flow path 4.

According to the double pipe 6 of this embodiment, when a valve 50 (FIG. 10, FIG. 11) is attached the flexible tank T, the outer diameter of the inner pipe 3 (FIGS. 4 to 8) is made smaller than the inner diameter of the cylinder 52 (FIGS. 10 and 11), and the inner diameter of the coupling body 10 (FIGS. 4 to 8) is made substantially equal to the outer diameter of the cylinder 52 (FIGS. 10 and 11) to thereby attach the valve 50 to the tank.

The double pipe according to this embodiment can be disassembled into two parts (first and second parts). Therefore, when a problem such as clogging occurs in the double pipe 6, operations to solve the problem can be easily performed.

The present invention is not limited to the embodiment described above, and can be modified in various ways.

Figure 12:
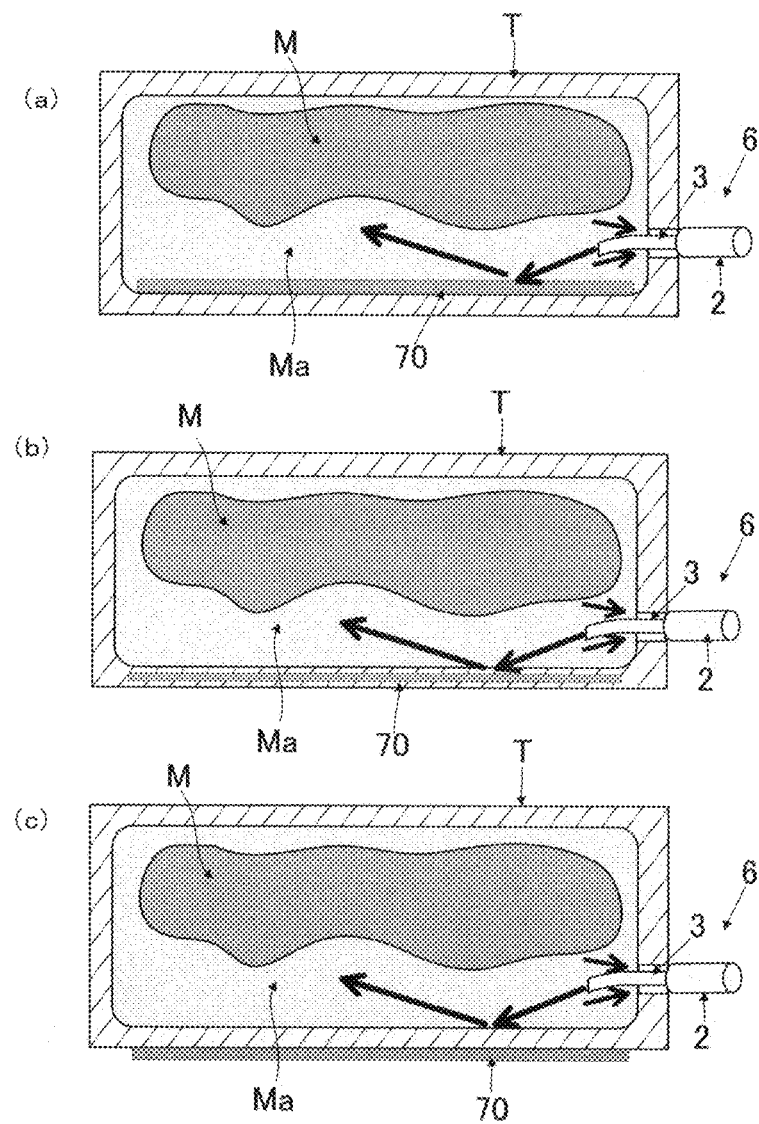
FIG. 12 is a schematic diagram showing the state of the inside of a tank to which a variation of the melting device is applied.

For example, the melting device 1 of the present invention may be provided with heating means 70 disposed inside the tank T, as shown in FIG. 12(a). In this case, the heating means 70 is a tubular body in which hot water or steam flows, and the tubular body is preferably a flexible pipe. For example, the flexible pipe can be a winding flexible pipe for water supply (RFL25) manufactured by Liviluck Co., Ltd. Alternatively, the heating means 70 is a heater pad provided with a conductor that generates heat through electrical resistance. When the heating means 70 (tubular body or heater pad) is disposed, the heat emitted by the heating means 70 heats the substance M in the tank T to melt the substance M, and the resulting high-temperature melt is suctioned from the suction pipe 2 and discharged from the discharge pipe 3 into the tank T, whereby the material M that has coagulated in the tank T can be melted early.

When the heating means 70 is a tubular body with hot water flowing inside, the hot water in the hot water tank T is supplied to the tubular body (heating means 70) through a first flow path by the pressure of the pump 5, and the hot water supplied to the tubular body is returned to the hot water tank through a second flow path. When the heating means 70 is a tubular body with steam flowing inside, the steam generated by a steam-water mixer is supplied to the tubular body (heating means 70) through the first flow path, and the steam supplied to the tubular body is discharged through the second flow path.

As shown in FIG. 12(b), the heating means 70 (tubular body or heater pad) may be buried in the wall of the tank T. Alternatively, as shown in FIG. 12(c), the heating means 70 may be disposed outside the tank T and abut the wall of the tank T. With such a configuration, it is unnecessary to dispose the heating means 70 inside of the tank T; accordingly, the tank T can be prevented from being torn by contact with the heating means 70.

When the heating means 70 is provided in the melting device 1, the direction of the discharge pipe 3 is adjusted so that the melt Ma discharged from the inside of the discharge pipe 3 to the inside of the tank T is directed to the position of the heating means 70, as shown in FIGS. 12(a), 12(b), and 12(c). With such arrangement, the melt Ma discharged from the discharge pipe 3 can be heated by the heating means 70, so that the high-temperature melt Ma can be circulated in the tank T. This allows the substance M in the tank T to be melted earlier. When the double pipe 6 shown in FIGS. 4 to 8 is used, the melt Ma discharged from the opening 3s of the discharge pipe 3 to the inside of the tank T can be directed to the position of the heating means 70 by bending the tip portion 3c of the discharge pipe 3 as shown in the figures.

Since the purpose of the present invention is to melt the substance M to be stored inside the tank T, the tank T does not comprise any cooling means to cool the substance M stored inside.

In the melting device 1 of the present invention, two hoppers 43A and 43B are not necessarily provided, and only one of the hoppers 43A and 43B may be provided. Alternatively, the hoppers 43 may be omitted. Even in this case, if the heating means 70 is provided in the melting device 1, the heat emitted by the heating means 70 can melt the substance M coagulated in the tank T, and the melt Ma can be suctioned from the suction pipe 2 and discharged from the discharge pipe 3 to thereby melt the substance M in the tank T. Alternatively, the substance M taken out from the tank T can be melted using a heater (e.g., a stove), and the melt Ma can be fed into the tank T. In this case, the melt Ma fed into the tank T can be suctioned from the suction pipe 2 and discharged from the discharge pipe 3, whereby the melt Ma can be used as priming oil that triggers the melting of the substance. When the tank T is used to transport a substance M, a melt of the substance to be prepared at the destination (i.e., a melt of the substance that was not stored in the tank T during transportation) may be fed into the tank T. Even in this case, the melt of the substance fed into the tank T is suctioned from the suction pipe 2 and discharged from the discharge pipe 3, so that the melt Ma of the substance fed into the tank T can be used as the priming oil that triggers the melting of the substance. The melt of the substance fed into the tank T may be a melt of the same kind of substance as the one stored in the tank T during transportation, or may be a melt of a substance of a kind different from the one stored in the tank T.

The melting device 1 may also be provided with a melt heating means for heating the melt Ma flowing through the circulation flow path 4. The melt heating means is a heat exchanger that exchanges heat between steam or hot water and the melt Ma. Alternatively, the melt heating means is a heater comprising a conductor that generates heat through electrical resistance. In this case, for example, the melt heating means (heater) is disposed so that the conductor is in contact with the pipe that constitutes the circulating flow path 4, and the heat of the conductor is thereby transferred to the melt Ma flowing in the circulating flow path 4.

In the melting device 1 of the present invention, the discharge pipe 3 and the suction pipe 2 do not necessarily need to be formed of a double pipe 6, and the discharge pipe 3 and the suction pipe 2 may be separately and independently attached to the wall of the tank T. If a double pipe 6 is used, both the discharge pipe 3 and the suction pipe 2 can be attached by attaching the double pipe 6 to the tank T. This reduces the time and effort required for attachment. Also, by using the double pipe 6, the discharge pipe 3 and the suction pipe 2 can be coaxially arranged, so that the melt Ma discharged from the discharge pipe 3 can be reliably suctioned into the suction pipe 2. This allows the melt Ma to continue to be discharged from the discharge pipe 3, so that the melting of the substance M can continue to occur.

In the melting device 1 of the present invention, a pump whose fluid pumping direction is restricted to one direction may be provided in the circulating flow path 4 in place of the pump 5 capable of pumping a fluid in a reverse direction as described above. Even in this case, by driving the pump, the melt Ma that is present in the tank T can be suctioned into the suction pipe 2, supplied to the inside of the discharge pipe 3 through the circulation flow path 4, and discharged into the tank T through the opening 3s of the discharge pipe 3, whereby the substance M in the tank T can be melted. A rotary pump or a centrifugal pump can be used as the "pump whose fluid pumping direction is restricted to one direction." As the centrifugal pump, for example, an LDP-type line pump (50LPD62.2A) manufactured by Ebara Corporation can be used.

The discharge pipe 3 may be composed of a mixing ejector comprising a nozzle and a diffuser. The nozzle is configured to inject the melt Ma, which is sent through the circulation flow path 4, into the diffuser. The diffuser is configured to suction the melt Ma that is present in the tank T by a pressure decrease due to ejection of the melt Ma from the nozzle, and injects the suctioned melt Ma into the tank T together with the melt Ma injected from the nozzle. The suctioned melt Ma is injected into the tank T together with the melt Ma ejected from the nozzle. By using the mixing ejector described above as the discharge pipe 3, a large amount of the melt Ma that is present around the discharge pipe 3 can be suctioned from the suction pipe 2 without requiring power (electric power, etc.) to increase the circulation amount of the melt Ma in the circulation flow path 4, thereby increasing the energy efficiency of the melting device 1 (that is, the amount of material melted per hour can be increased while keeping the energy required to drive the melting device 1 small). As the mixing ejector described above, for example, a Mixing Eductor 3MP manufactured by Yamamoto Sangyo Co., Ltd. can be used.

A spray nozzle through which the melt Ma is sprayed may be attached to the tip of the discharge pipe 3. The use of the spray nozzles described above can accelerate the stirring of the melt Ma in the tank T, thus speeding up the melting of the substance M. For example, a TURBO DISC manufactured by Nippon Howard Corporation can be used as the spray nozzle.

The melting device 1 of the present invention may also comprise a gas supply means capable of supplying gas to the circulation flow path 4. When the gas supply means is used, air bubbles are ejected from the discharge pipe 3 into the tank T together with the melt Ma, thereby promoting stirring of the melt Ma in the tank T. As the gas supply means described above, for example, a gas-liquid shear-type microbubble generator (BL12AA-12-D4, direct operation-type) manufactured by Nitta-Moore Corporation can be used. If the flexible tank T is used as the tank T, the gas discharged into the tank T can be discharged from a safety valve provided in the flexible tank T.

The substance M that can be melted by the melting device 1 of the present invention is not limited to waxes and fats. The objects to be melted by the melting device 1 of the present invention can be various substances that can be melted by the heat of the melt Ma.

The tank T for storing the substance M to be melted is not limited to a flexible tank made of vinyl; a tank T made of a material other than vinyl may be used. For example, the tank T may be an ISO (International Organization for Standardization) tank made of metal. In this case, the suction pipe 2 and discharge pipe 3 are attached to the wall of the ISO tank by known means.

Figure 13:
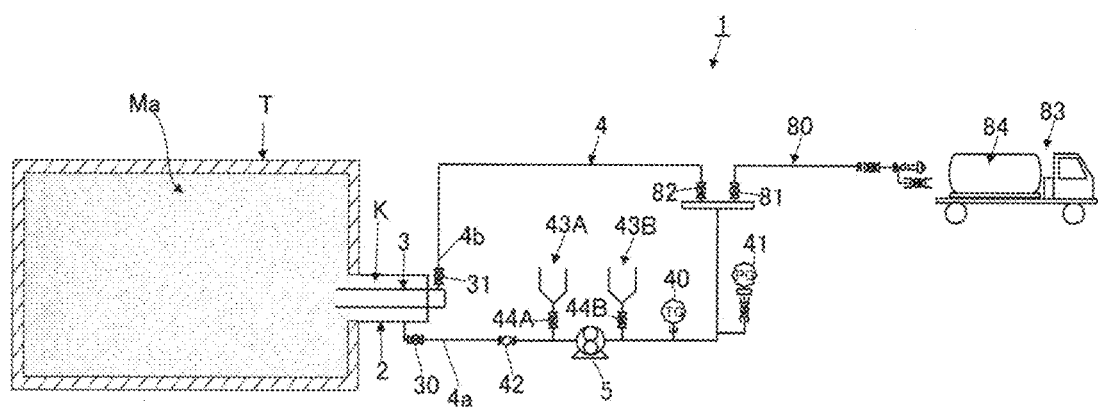
FIG. 13 is a schematic diagram showing a variation of the melting device of the present invention.
Figure 14:
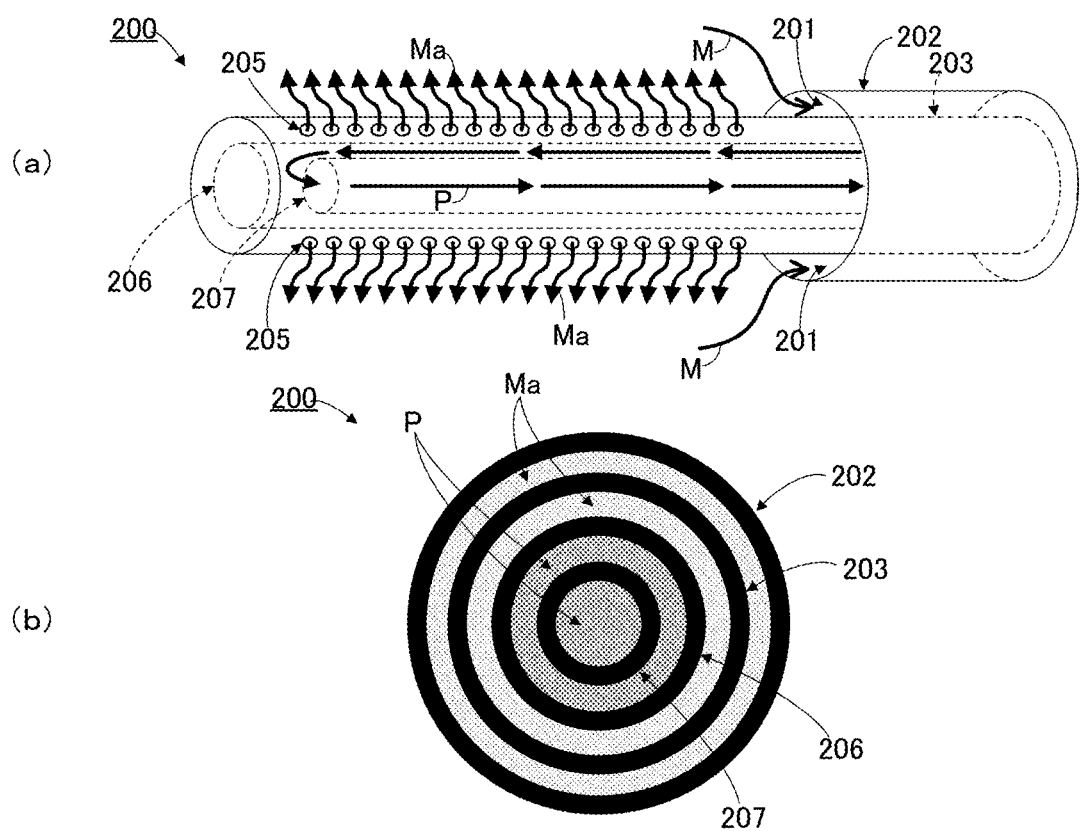
FIG. 14 is a schematic diagram of the heat exchanger 200 disclosed in Patent Literature (PTL) 1.
Figure 15:
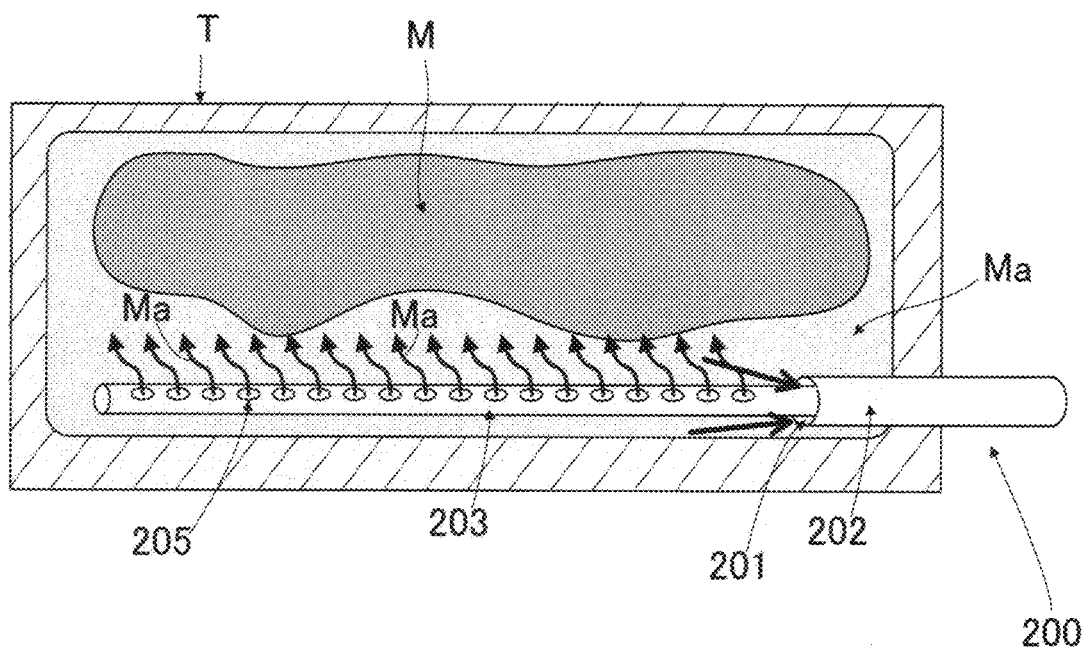
FIG. 15 is a schematic diagram showing the internal state of a tank to which the melting device disclosed in PTL 1 is applied.
Figure 16:
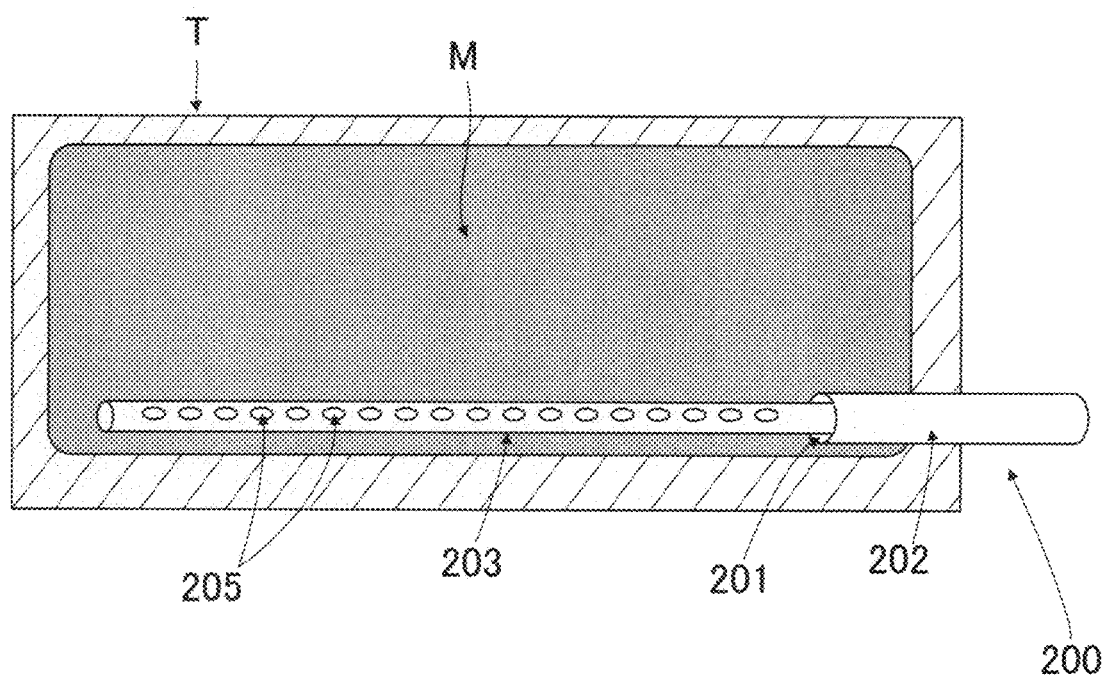
FIG. 16 is a schematic diagram showing the internal state of a tank to which the melting device disclosed in PTL 1 is applied.

In the melting device 1 of the present invention, as shown in FIG. 13, a discharge channel 80 for discharging the melt Ma flowing through the circulating flow path 4 may be connected to the circulating flow path 4. In this case, a fourth on-off valve 81 is provided in the discharge channel 80. By opening the on-off valve 81, some of the melt Ma flowing through the circulating flow path 4 into the discharge channel 80 can be allowed to flow into the discharge channel 80. Further, a fifth on-off valve 82 may be provided at a position of the circulation flow path 4 that is downstream of the connection point of the discharge flow path 80. In this case, by opening the fourth on-off valve 81 and closing the fifth on-off valve 82, all of the melt Ma flowing through the circulating flow path 4 can flow into the discharge channel 80. In the case where the discharge channel 80 is provided as described above, for example, the melt Ma flowing through the discharge channel 80 is fed into the tank 84 of the truck 83, and the melt Ma is transported by the truck 83.

The present inventors conducted an experiment to compare the performance of the melting device of an Example of the present invention with that of the melting device of a Comparative Example. This experiment is described below.

The following operations were performed to check the performance of the melting devices of the present invention in the Examples.

After a flexible pipe (heating means 70) was inserted into a flexible tank T, the tank T was filled with 110 kg of palm oil mid-melting point fraction (PMF: Palm Mid-Fraction). After this, the tank T was allowed to stand in a room at 20° C. for 3 days to solidify the oil in the tank T. A hand drill was then inserted into the tank T through a hole in the tank T. A part of the solidified oil was scraped off by the rotation of the hand drill, and a hole was made in the oil. Subsequently, a double pipe 6 was attached to the tank T so that the tip of the discharge pipe 3 could be placed in the hole, and a circulation flow path 4 was connected to the double pipe 6. Subsequently, the scraped oil was fed into the primary-side hopper 43A to melt the oil. After this, hot water of 70° C. to 80° C. was started to flow through the inside of the flexible pipe (heating means 70) at a flow rate of 0.7 m$^3$/h. At the same time, with the first on-off valve 30 being closed and the second on-off valve 31 and the third on-off valve 44A being open, the pump 5 was driven to discharge the melt Ma in the hopper 43A into the tank T. With the second on-off valve 30 being closed and the third on-off valve 31 and 44A being open, the pump 5 was driven to discharge the melt Ma in the hopper 43A into the tank T. After this, the first on-off valve 30 was opened in order to suction the melt Ma that was present in the tank T, and discharge the melt Ma into the tank T. The temperature of the melt Ma and the condition in the tank T were checked 4 hours and 5 hours after the start of allowing the water to flow into the flexible pipe (hereinafter referred to as the "water flow start time").

The melting device of the Comparative Example is one in which the double pipe 6 and the circulation flow path 4 are omitted from the melting device of the Example. The following operations were performed to check the performance of the melting device of the Comparative Example.

After the flexible pipe was inserted into the flexible tank T, the tank T was filled with 110 kg of palm oil mid-fraction (PMF). After this, the tank T was left in a room of 20° C. for 3 days to allow the oil in the tank T to solidify. Hot water of 70 to 80° C. was started to flow into the flexible pipe at a flow rate of 0.7 m$^3$/h. The temperature of the melt Ma and the condition in the tank T were checked 4 hours and 5 hours after the start of allowing the water to flow into the flexible pipe (hereinafter referred to as the "water flow start time").

Table 1 below shows the results confirmed by the above operations.

TABLE 1

|  | Elapsed time | | | |
|---|---|---|---|---|
|  | 4 hours | | 5 hours | |
|  | Temperature of melt Ma | State in tank T | Temperature of melt Ma | State in tank T |
| Melting device of Example | 55.0° C. | No solid oil residue | 65.0° C. | No solid oil residue |
| Melting device of Comparative Example | 31.0° C. | Solid oil residue observed | 43.8° C. | Solid oil residue: 15.4 g |

As shown in Table 1, when the melting device of the Example comprising the double pipe 6 and the circulation flow path 4 was used, the temperature of the melt Ma 4 hours or 5 hours after the water flow start time was higher than that when the melting device of the Comparative Example not comprising the double pipe 6 or the circulation flow path 4 was used. Further, when the melting device of the Example was used, all of the oil in the tank T melted after 4 hours, whereas when the melting device of the Comparative Example was used, solid oil (unmelted oil) remained in the tank even after 5 hours. The above results confirmed that the melting device of the present invention comprising the double pipe 6 and the circulation flow path 4 can melt fats and oils in the tank T early (in other words, it was confirmed that the fats and oils in the tank T can be melted early by suctioning the melt in the tank T and discharging the melt into the tank T).

DESCRIPTION OF REFERENCE SYMBOLS

1: Melting device
2: Suction pipe (outer pipe)
3: Discharge pipe (inner pipe)
3a: Base end of inner pipe
4: Circulation flow path
4a: One end of circulation flow path
4b: Other end of circulation flow path
5: Pump
6: Double Pipe
7: Coupling
8c: Tip side of outer pipe body (tip side of outer pipe)
10: Coupling body
10a: Tip side of coupling body
11A, 11B: Lever
22: First flange
23: Second flange
43: Hopper
43A: Primary-side hopper
43B: Secondary-side hopper
44: Third on-off valve (on-off valve)
44A: Primary-side third on-off valve (primary-side on-off valve)
44B: Secondary-side third on-off valve (secondary-side on-off valve)
70: Heating means
M: substance
Ma: Melt of substance
T: tank

The invention claimed is:

1. A melting device for discharging a melt of a substance into a tank to melt the substance stored in the tank, the device comprising
   a suction pipe attached to the wall of the tank;
   a discharge pipe attached to the wall of the tank; and
   a circulation flow path disposed outside the tank, the circulation flow path having a first end and a second end,
wherein
   the inside of the tank communicates with the inside of the first end of the circulation flow path through the inside of the suction pipe; and the inside of the tank communicates with the inside of the second end of the circulation flow path through the inside of the discharge pipe;
   a pump is provided at a midway position of the circulation flow path; by driving the pump, the melt of the substance that is present in the tank can be suctioned into the suction pipe, circulated through the circulation flow path, and discharged from inside the discharge pipe into the tank; the entire inside of the discharge pipe is used as a flow path for the melt; and at least a portion of the melt of the substance is discharged into the inside of the tank through an end opening of the discharge pipe;
   at least a portion of the discharge pipe is surrounded by the suction pipe;
   the substance is a wax or oil/fat; and
   the tank is made of a vinyl compound or a metal and does not comprise a means for cooling the substance stored inside.

2. The melting device according to claim 1, wherein the discharge pipe having a small diameter is disposed inside of the suction pipe having a large diameter, and the inside of the tank communicates with the inside of the first end of the circulation flow path through a space outside of the discharge pipe in the suction pipe.

3. The melting device according to claim 1, comprising a heating means that is disposed outside the tank and abuts the wall of the tank.

4. The melting device according to claim 1, comprising a heating means disposed inside of the tank.

5. The melting device according to claim 1, comprising a melt heating means that is disposed in the circulation flow path between the first end and the second end of the circulation flow path and that heats the melt flowing through the circulation flow path.

6. The melting device according to claim 1, wherein a spray nozzle through which the melt is sprayed is attached to a tip of the discharge pipe.

7. The melting device according to claim 1, further comprising a gas supply capable of supplying heated gas to the circulation flow path.

8. The melting device according to claim 1, further comprising a hopper in which the melt of a substance can be stored, wherein the hopper is connected to the circulation flow path via an on-off valve.

9. The melting device according to claim 8, wherein
   a metal pipe is wound around an outer circumference of the hopper; and
   steam or hot water is allowed to flow inside of the metal pipe with the substance being placed in the hopper to thereby melt the substance in the hopper and store the melt in the hopper.

10. The melting device according to claim 1, comprising a heating means that is buried in the wall of the tank.

11. The melting device according to claim 10, wherein the heating means is a tubular body through which hot water or steam is allowed to flow.

12. The melting device according to claim 10, wherein the heating means is a pad with a conductor that generates heat through electrical resistance.

13. The melting device according to claim 10, wherein the direction of the discharge pipe is adjusted so that the melt discharged from the inside of the discharge pipe into the tank is directed to the position of the heating means.

14. A melting device for discharging a melt of a substance into a tank to melt the substance stored in the tank, the device comprising
   a suction pipe attached to the wall of the tank;
   a discharge pipe attached to the wall of the tank;
   a circulation flow path disposed on the outside of the tank, the circulation flow path having a first end and a second end; and
   a plurality of hoppers in which the melt of the substance is to be stored and that is connected to the circulation flow path via a plurality of on-off valves;
wherein
   the inside of the tank communicates with the inside of the first end of the circulation flow path through the inside of the suction pipe;
   the inside of the tank communicates with the inside of the second end of the circulation flow path through the inside of the discharge pipe;
   a pump is disposed at a midway position of the circulation flow path; by driving the pump, the melt of the substance that is present in the tank is suctioned into the suction pipe, circulated through the circulation flow path, and discharged from inside the discharge pipe into the tank; the entire inside of the discharge pipe is used as a flow path for the melt; and at least a portion of the melt of the substance is discharged into the inside of the tank through an end opening of the discharge pipe;
   the plurality of hoppers comprises a primary-side hopper and a secondary-side hopper;
   the primary-side hopper is connected to the primary side of the pump in the circulation flow path via a primary-side on-off valve of the plurality of on-off valves;
   the secondary-side hopper is connected to the secondary side of the pump in the circulation flow path via a secondary-side on-off valve of the plurality of on-off valves; and
   the pump is capable of pumping a fluid in a reverse direction; wherein the discharge pipe passes inside the suction pipe.

15. The melting device according to claim 14, wherein
   a metal pipe is wound around an outer circumference of one of the plurality of hoppers; and
   steam or hot water is allowed to flow inside the metal pipe with the substance being placed in the one of the plurality of hoppers to thereby melt the substance in the one of the plurality of hoppers and store the melt in the one of the plurality of hoppers.

16. A melting device for discharging a melt of a substance into a tank to melt the substance stored in the tank,
   the device comprising
   a suction pipe attached to the wall of the tank;
   a discharge pipe attached to the wall of the tank; and
   a circulation flow path disposed outside the tank, the circulation flow path having a first end and a second end;
wherein
   the inside of the tank communicates with the inside of the first end of the circulation flow path through the inside of the suction pipe;
   the inside of the tank communicates with the inside of the second end of the circulation flow path through the inside of the discharge pipe;
   a pump is disposed at a midway position of the circulation flow path; by driving the pump, the melt of the substance that is present in the tank is suctioned into the suction pipe, circulated through the circulation flow path, and discharged from inside the discharge pipe into the tank; the entire inside of the discharge pipe is used as a flow path for the melt; and at least a portion of the melt of the substance is discharged into the inside of the tank through an end opening of the discharge pipe;
   the discharge pipe comprising a mixing ejector comprising a nozzle and a diffuser;
   the nozzle ejecting the melt sent through the circulation flow path into the diffuser,
   the diffuser suctioning the melt present in the tank through the section pipe by a pressure decrease due to ejection of the melt from the nozzle; wherein the discharge pipe passes inside the suction pipe.

17. A double pipe for discharging a melt of a substance into a tank to melt the substance stored in the tank,
   the double pipe comprising
   an outer pipe;
   an inner pipe that passes inside the outer pipe; and
   a coupling;
wherein
   the inside of the tank communicates with the inside of a first end of the circulation flow path through a space outside of the inner pipe in the outer pipe; the inside of the tank communicates with the inside of a second end of the circulation flow path through the inside of the inner pipe;
   a pump disposed at a midway position of the circulation flow path is driven, whereby the melt of the substance that is present in the tank can be suctioned into a space outside of the inner pipe in the outer pipe, circulated through the circulation flow path, and discharged from the inside of the inner pipe into the tank; the entire inside of the inner pipe is used as a flow path for the melt; and at least a portion of the melt of the substance is discharged into the inside of the tank through an end opening of the inner pipe;
   the coupling comprises a cylindrical coupling body and a lever that is tiltably attached to the coupling body;
   a base end side of the coupling body is covered with a tip side of the outer pipe;
   by tilting the lever, the degree of projection of the lever to the inside of the coupling body can be reduced; and by tilting the lever in the opposite direction, the degree of projection of the lever to the inside the coupling body can be increased;
   the inner pipe passes through the inside of the outer pipe and the inside of the coupling body; a base end side of the inner pipe extends from a base end side position of the outer pipe; at a base end side of the outer pipe, a gap between the outer pipe and the inner pipe is blocked by an annular member; and
   a tip side of the inner pipe extends from a tip of the coupling body.

18. The double pipe according to claim 17, which is a combination of a first member and a second member,
   the first member comprising the base end side of the outer pipe, the annular member, and the inner pipe,
   the second member comprising the tip side of the outer pipe and the coupling, wherein
   a first flange is provided on the base end side of the outer pipe, and a second flange is provided on the tip side of the outer pipe,
   the first flange and the second flange each project radially outwardly from the outer pipe and extend in the circumferential direction of the outer pipe,
   the first flange and the second flange are butt-jointed and bolted together to combine the first member and the second member, thus forming the double pipe; and by unfastening the bolts, the double pipe can be disassembled into the first member and the second member.

19. A double pipe for discharging a melt of a substance into a tank to melt the substance stored in the tank, the double pipe comprising
   an outer pipe and
   an inner pipe that passes through the outer pipe;
   wherein
      the inside of the tank communicates with the inside of a first end of a circulation flow path through a space outside of the inner pipe in the outer pipe; and the inside of the tank communicates with the inside of a second end of the circulation flow path through the inside of the inner pipe;
      by driving a pump disposed at a midway position of the circulation flow path, the melt of the substance that is present in the tank can be suctioned into a space outside of the inner pipe in the outer pipe, circulated through the circulation flow path, and discharged from the inside of the inner pipe to the inside of the tank; the entire inside of the inner pipe is used as a flow path for the melt; and at least a portion of the melt of the substance is discharged into the inside of the tank through an end opening of the inner pipe;
      the substance is a wax or fat/oil;
      the tank is made of vinyl or a metal; and
      the tank does not have a means for cooling the substance stored inside.

20. A method for melting a substance stored in a tank by using a melting device,
   the melting device being configured to discharge a melt of a substance into the tank to melt the substance stored in the tank,
   the device comprising:
      a suction pipe attached to the wall of the tank;
      a discharge pipe attached to the wall of the tank;
      a circulation flow path disposed outside the tank, the circulation flow path having a first end and a second end; and
      a hopper in which the melt of the substance is to be stored and that is connected to the circulation flow path via an on-off valve;
   wherein
      the inside of the tank communicates with the inside of the first end of the circulation flow path through the inside of the suction pipe;
      the inside of the tank communicates with the inside of the second end of the circulation flow path through the inside of the discharge pipe;
      a pump is disposed at a midway position of the circulation flow path; by driving the pump, the melt of the substance that is present in the tank can be suctioned into the suction pipe, circulated through the circulation flow path, and discharged from inside the discharge pipe into the tank; and the entire inside of the discharge pipe is used as a flow path for the melt; and
   the method comprising the steps of
      taking out a part of the substance solidified in the tank;
      storing in the hopper a melt obtained by melting the substance taken out from the tank;
      driving the pump with the on-off valve being open to supply the melt stored in the hopper into the discharge pipe through the circulation flow path and discharging the melt from an opening at the tip of the discharge pipe into the tank, whereby the substance present in the vicinity of the discharge pipe among the substance present in the tank is melted to form a melt; and
      driving the pump with the on-off valve being closed to suction the melt present in the tank into the suction pipe and supply the melt into the discharge pipe through the circulation flow path, and discharge the melt from the opening at the tip of the discharge pipe into the tank to thereby melt the substance present in an unmelted state in the tank; wherein the discharge pipe passes inside the suction pipe.

* * * * *